United States Patent
Nimura

(10) Patent No.: US 10,241,239 B2
(45) Date of Patent: Mar. 26, 2019

(54) LENS ARRAY SUBSTRATE, ELECTRO-OPTICAL DEVICE, ELECTRONIC APPARATUS, MICRO-LENS SUBSTRATE MANUFACTURING METHOD, AND ELECTRO-OPTICAL DEVICE MANUFACTURING METHOD

(71) Applicant: Seiko Epson Corporation, Tokyo (JP)

(72) Inventor: Toru Nimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 15/409,623

(22) Filed: Jan. 19, 2017

(65) Prior Publication Data
US 2017/0219744 A1    Aug. 3, 2017

(30) Foreign Application Priority Data
Jan. 29, 2016    (JP) ................. 2016-015309

(51) Int. Cl.
| | |
|---|---|
| *G02B 3/00* | (2006.01) |
| *G02B 5/30* | (2006.01) |
| *G02B 27/14* | (2006.01) |
| *G03B 21/00* | (2006.01) |
| *G02F 1/1335* | (2006.01) |
| *G02F 1/1333* | (2006.01) |

(Continued)

(52) U.S. Cl.
CPC ......... *G02B 3/0025* (2013.01); *G02B 27/149* (2013.01); *G02F 1/1368* (2013.01); *G02F 1/13439* (2013.01); *G02F 1/133526* (2013.01); *G02F 1/134309* (2013.01); *G03B 21/006* (2013.01); *H04N 9/3105* (2013.01); *G02B 3/0056* (2013.01); *G02B 3/0068* (2013.01); *G02B 5/3083* (2013.01); *G02F 2201/121* (2013.01); *G02F 2201/123* (2013.01)

(58) Field of Classification Search
CPC .. G02B 3/0025; G02B 27/149; G03B 21/006; G02C 7/10
See application file for complete search history.

(56) References Cited

U.S. PATENT DOCUMENTS

| | | | |
|---|---|---|---|
| 2003/0228759 A1* | 12/2003 | Uehara | ............... B81C 1/00031 |
| | | | 438/689 |
| 2004/0232105 A1 | 11/2004 | Kaise et al. | |

(Continued)

FOREIGN PATENT DOCUMENTS

| | | |
|---|---|---|
| JP | 2003-185804 A | 7/2003 |
| JP | 2004-258052 A | 9/2004 |

*Primary Examiner* — Paul C Lee
(74) *Attorney, Agent, or Firm* — ALG Intellectual Property, LLC

(57) ABSTRACT

An element substrate is formed as a lens array substrate on which a plurality of lenses are formed. In a method of manufacturing the lens array substrate, first recess sections are formed on one surface of the substrate, and then a plurality of lens surfaces, which include concave surfaces, are formed at the bottoms of the first recess sections 195. Subsequently, after a light-transmitting lens layer is formed to fill the inside of the first recess sections, flattening is performed while the lens layer is removed. Here, the surface of the lens layer on a side opposite to the substrate is a planar surface which is contiguous to an outside area that is positioned on the outer side of the first recess sections on the one surface of the substrate.

17 Claims, 12 Drawing Sheets

(51) Int. Cl.
*G02F 1/1337* (2006.01)
*G02F 1/1343* (2006.01)
*G02F 1/1345* (2006.01)
*G02F 1/1362* (2006.01)
*G02F 1/1368* (2006.01)
*H04N 9/31* (2006.01)

(56) References Cited

U.S. PATENT DOCUMENTS

| | | | |
|---|---|---|---|
| 2006/0046486 A1* | 3/2006 | Ozawa | G02B 3/0012 |
| | | | 438/689 |
| 2006/0208284 A1 | 9/2006 | Kaise et al. | |
| 2007/0238296 A1* | 10/2007 | Shimizu | G02B 3/0031 |
| | | | 438/689 |
| 2009/0009702 A1* | 1/2009 | Chidate | G02F 1/13363 |
| | | | 349/120 |
| 2014/0218664 A1* | 8/2014 | Nimura | G02F 1/133526 |
| | | | 349/95 |
| 2014/0285708 A1* | 9/2014 | Kwon | H04N 5/2254 |
| | | | 348/360 |
| 2015/0092139 A1* | 4/2015 | Eguchi | G03B 21/2073 |
| | | | 349/95 |

* cited by examiner

LENS ARRAY SUBSTRATE, ELECTRO-OPTICAL DEVICE, ELECTRONIC APPARATUS, MICRO-LENS SUBSTRATE MANUFACTURING METHOD, AND ELECTRO-OPTICAL DEVICE MANUFACTURING METHOD

BACKGROUND

1. Technical Field

The present invention relates to a lens array substrate, in which the concave surfaces of the substrate are covered by a lens layer, an electro-optical device, an electronic apparatus, a micro-lens substrate manufacturing method, and an electro-optical device manufacturing method.

2. Related Art

In an electro-optical device (liquid crystal apparatus) which is used as the light valve or the like of a projection-type display apparatus, a liquid crystal layer is arranged between an element substrate, on which pixel electrodes and pixel switching elements are formed, and a counter substrate, on which common electrodes are formed. In the electro-optical device, a configuration is proposed in which a plurality of lenses that overlap the plurality of respective pixel electrodes in plan view are formed on one or both of the counter substrate and the element substrate in order to improve the quality of an image. In addition, in a case in which the lenses are formed, a technology is proposed in which lens surfaces, which include concave surfaces, are formed on a substrate, a lens layer is formed on the whole surfaces, and lenses are formed by flattening the surface of the lens layer (refer to JP-A-2004-258052). In the technology disclosed in JP-A-2004-258052, in a case in which the flattening is performed, the lens layer remains throughout all one surface of the substrate in addition to the insides of the concave surfaces. In the configuration, difference in the thickness of the lens layer is large in an in-plane direction of the substrate. Therefore, in a case in which high temperature is applied to the lens layer in a step that is performed after the lens layer is formed, stress is concentrated on the specific spots of the lens layer due to the difference in thickness. Since the stress causes cracks to be generated in the lens layer, the stress is not preferable. In contrast, in a case in which the lenses are formed, a technology is proposed in which lens surfaces, which include concave surfaces, are formed on one surface of a substrate, a lens layer is formed, and the lens layer is caused to selectively remain on the insides of the concave surfaces by polishing the lens layer (refer to JP-A-2003-185804).

In the technology disclosed in JP-A-2003-185804, in a case in which the lens layer is polished until the lens layer is completely broken between the lens surfaces, the surface of the substrate, which is positioned between adjacent lens surfaces, is also polished. Therefore, parts of the lens surfaces are polished, and thus a problem occurs in that the characteristics of the lenses are deteriorated.

SUMMARY

An advantage of some aspects of the invention is that a lens array substrate manufacturing method, an electro-optical device manufacturing method, a lens array substrate, an electro-optical device, and an electronic apparatus, which are capable of preventing cracks from occurring in a lens layer and are capable of suitably forming lens surfaces, are provided.

According to a first aspect of the invention, there is provided a lens array substrate including: a light-transmitting substrate on one surface of which a plurality of lens surfaces, which include concave surfaces, are formed; and a light-transmitting lens layer that covers the plurality of lens surfaces, in which first recess sections are provided on the one surface of the substrate, the lens surfaces are provided to be recessed from bottoms of the first recess sections toward another side surface of the substrate, and a surface of the lens layer on a side opposite to the substrate forms a planar surface which is contiguous to an outside area that is positioned outside of the first recess sections on the one surface of the substrate.

According to a second aspect of the invention, there is provided a lens array substrate manufacturing method including: forming first recess sections on one surface of a light-transmitting substrate; forming a plurality of lens surfaces, which include concave surfaces, at bottoms of the first recess section; forming a light-transmitting lens layer on the one surface of the substrate to fill insides of the first recess sections; and flattening the lens layer by removing the lens layer to midst of the first recess sections in a depth direction from a side opposite to the substrate, and causing a surface of the lens layer on a side opposite to the substrate to be a planar surface which is contiguous to an outside area that is positioned outside of the first recess sections on the one surface of the substrate.

According to the aspect, in the forming of the first recess sections, the first recess sections are formed on one surface of the substrate. Thereafter, in the forming of the lens surfaces, the plurality of lens surfaces, which includes the concave surfaces, are formed at the bottoms of the first recess sections. In addition, in the forming of the lens layer, the light-transmitting lens layer is formed to fill the inside of the recess sections. Thereafter, in the flattening the lens layer, the flattening is performed while the lens layer is being removed, and the surface of the lens layer on the side opposite to the substrate is caused to be a planar surface which is contiguous to the outside area that is positioned on the outer side of the first recess sections in the substrate. Therefore, the lens layer does not remain in the outside area, and thus a lens layer forming area is narrow. Therefore, even though high temperature is applied to the lens layer in a step which is performed after the lens layer is formed, it is difficult for stress to be concentrated on the specific spots of the lens layer. Therefore, it is difficult for cracks to be generated in the lens layer. In addition, in the flattening of the lens layer, the lens layer, which is formed in the outside area on the outer side of the first recess sections, may be removed. Therefore, the lens layer may be removed to the midst of the first recess sections in the depth direction. Therefore, it is difficult for a situation, in which some parts of the lens surfaces (concave surfaces) are removed, to be generated. Therefore, it is possible to suitably form the lens surfaces.

According to the aspect, it is possible to use an aspect in which a second recess section, which includes a mark at a bottom, is provided on the one surface of the substrate. In the lens array substrate manufacturing method, the forming of the first recess sections may include forming a second recess section on one surface of the substrate, the lens array substrate manufacturing method may further include forming a mark at a bottom of the second recess section after the forming of the first recess sections and before the flattening of the lens layer, and the flattening of the lens layer may include monitoring a thickness of the lens layer to be removed using the mark as an index. In the lens array substrate which is manufactured by the manufacturing method, it is possible to monitor the quantity of removal of the lens layer using the mark according to the configuration. Therefore, it is difficult for a situation, in which the lens surfaces (concave surfaces) are polished, to be generated. Therefore, it is possible to suitably form the lens surfaces.

According to the aspect, it is possible to use an aspect in which the first recess sections are provided in respective areas in which the plurality of lens surfaces are formed. In the lens array substrate manufacturing method, the forming of the first recess sections may include forming the first recess sections in the respective areas in which the plurality of lens surfaces are formed.

According to the aspect, it is possible to use an aspect in which the first recess sections are formed in throughout all areas in which the plurality of lens surfaces are formed and spaces between the areas in which the plurality of lens surfaces are formed. In the lens array substrate manufacturing method, the forming of the first recess sections may include forming the first recess sections throughout all areas in which the plurality of lens surfaces are formed and spaces between the areas in which the plurality of lens surfaces are formed.

According to a third aspect of the invention, there is provided an electro-optical device, which includes the lens array substrate according to the aspect, including pixel electrodes that overlap the lens surfaces in a plan view viewed from a direction which is perpendicular to the substrate. For example, the electro-optical device includes an element substrate that is provided with the pixel electrodes and pixel transistors which are electrically connected to the pixel electrodes; a counter substrate that is provided with common electrodes which face the pixel electrodes; and an electro-optical layer that is provided between the element substrate and the counter substrate, in which the lens array substrate is used for at least one of the element substrate and the counter substrate. The electro-optical device manufacturing method may include forming, after the lens layer is formed, a plurality of pixel electrodes on the lens layer on a side opposite to the substrate, the plurality of pixel electrodes overlapping the plurality of respective lens surfaces in a plan view viewed from a direction which is perpendicular to the substrate, and a plurality of pixel switching elements that are electrically connected to the plurality of respective pixel electrodes.

The electro-optical device according to the aspect is used for various electronic apparatuses. According to the aspect, in a case in which the electro-optical device is used for a projection-type display apparatus of an electronic apparatus, the projection-type display apparatus includes a light source unit that emits light which is supplied to the electro-optical device, and a projection optical system that projects light which is modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
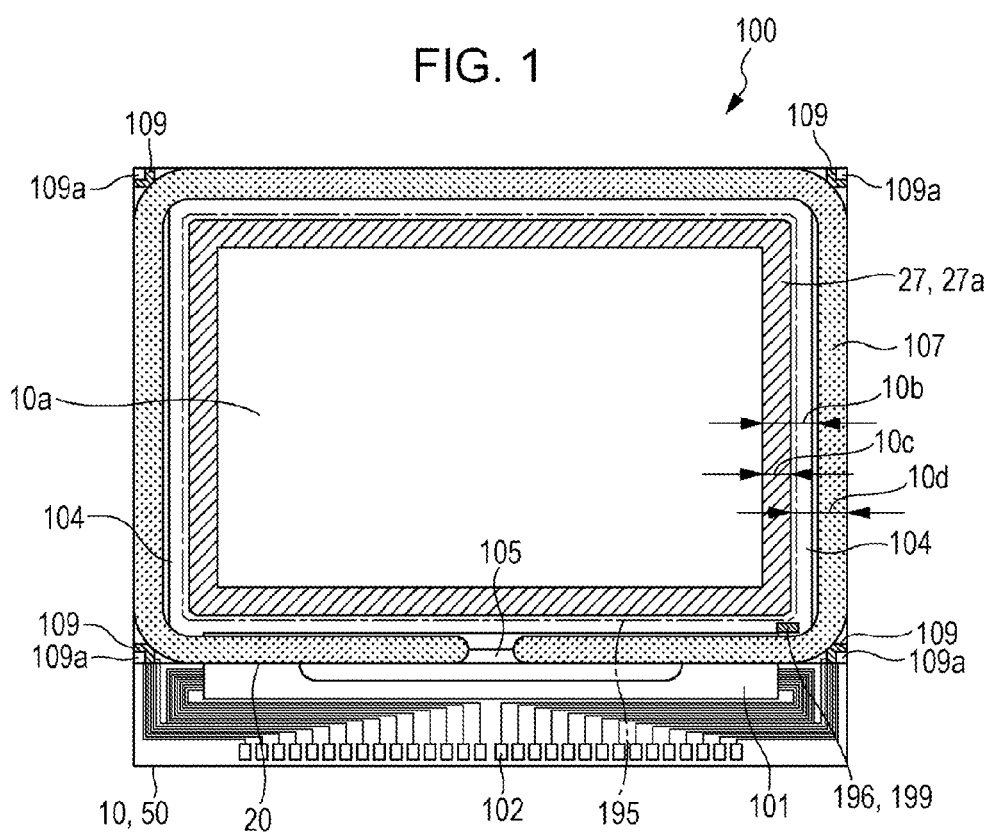
FIG. 1 is a plan view illustrating an electro-optical device to which the invention is applied.

Embodiments of the invention will be described with reference to the accompanying drawings. Meanwhile, in the drawings which are referred to in the description below, each layer and each member are shown at sizes which can be recognized in the drawing, and thus the scales thereof are different for each layer and each member. In addition, in the description below, in a case in which a layer which is formed on an element substrate is described, "an upper layer side or a surface side" means a side on which a counter substrate is located, and "a lower layer side" means an opposite side on which the counter substrate is located.

First Embodiment

Configuration of Electro-Optical Device

Figure 2:
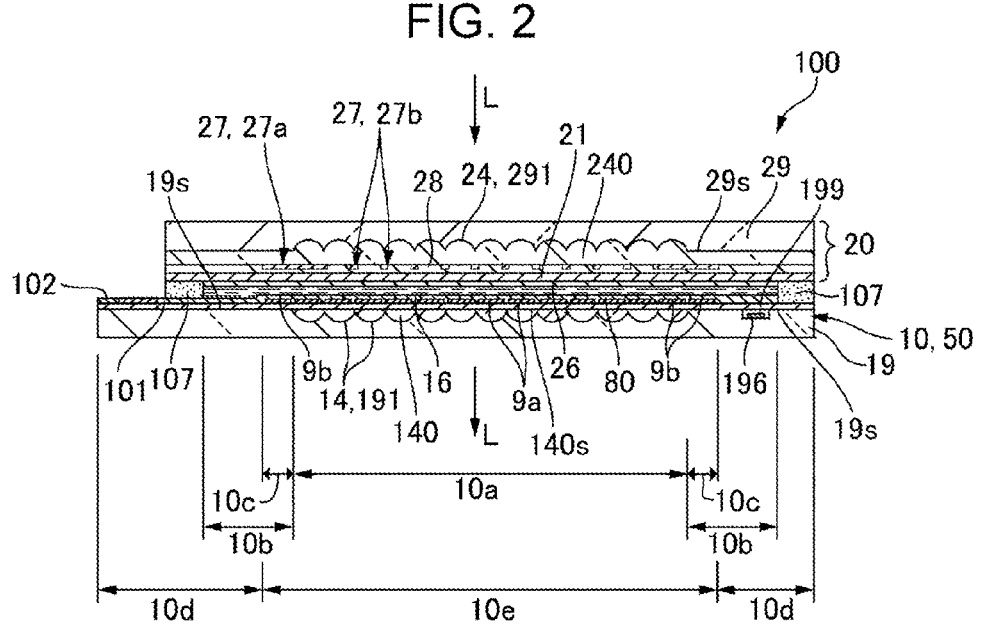
FIG. 2 is a sectional view illustrating the electro-optical device to which the invention is applied.

FIG. 1 is a plan view illustrating an electro-optical device 100 to which the invention is applied. FIG. 2 is a sectional view illustrating the electro-optical device 100 to which the invention is applied.

As illustrated in FIG. 1, in the electro-optical device 100, an element substrate 10 and a counter substrate 20 are bonded by a seal material 107 disposed in a predetermined gap, and the element substrate 10 faces the counter substrate 20. The seal material 107 is provided in a frame shape along the outer edge of the counter substrate 20, and an electro-optical layer 80, such as a liquid crystal layer, is arranged in an area which is surrounded by the seal material 107 between the element substrate 10 and the counter substrate 20. Accordingly, the electro-optical device 100 is formed as a liquid crystal apparatus. The seal material 107 is a photosetting adhesive, or a photosetting and thermosetting adhesive, and contains a gap material, such as glass fibers or glass beads, in order to set the distance between both of the substrates to a predetermined value.

Both the element substrate 10 and the counter substrate 20 have a square shape, and a display area 10a is provided at approximately the center of the electro-optical device 100 as a square-shaped area. According to the shape, the seal material 107 is also provided in an approximately square shape, and a rectangular-shaped peripheral area 10b is provided between the inner periphery of the seal material 107 and the outer periphery of the display area 10a. A data line drive circuit 101 and a plurality of terminals 102 are formed along one side of the element substrate 10 on the outside of the display area 10a on a surface of the element substrate 10 on the side of the counter substrate 20, and a scan line drive circuit 104 is formed along another side which is adjacent to the one side. A flexible wiring substrate (not shown in the drawing) is connected to the terminals 102. A plurality of light-transmitting pixel electrodes 9a, which include Indium Tin Oxide (ITO) films or the like, and pixel switching elements (not shown in the drawing), which are electrically connected to the plurality of respective pixel electrodes 9a, are formed in a matrix shape in the display area 10a on the surface of the element substrate 10 on the side of the counter substrate 20. A first oriented film 16 is formed on the pixel electrodes 9a on the side of the counter substrate 20, and the pixel electrodes 9a are covered by the first oriented film 16.

A light-transmitting common electrode 21, which includes an ITO film, is formed on the side of a surface of the counter substrate 20 which faces the element substrate 10, and a second oriented film 26 is formed on the common electrode 21 on the side of the element substrate 10. The common electrode 21 is formed on approximately the entire surface of the counter substrate 20 and is covered by the second oriented film 26. A light-shield layer 27 is formed on the common electrode 21 on a side opposite to the element substrate 10. The light-shield layer 27 is formed, for example, as a parting 27a in a frame shape, which extends along the outer periphery of the display area 10a. In addition, the light-shield layer 27 is also formed as light-shield layers 27b in an area which overlaps an area interposed by adjacent pixel electrodes 9a in a plan view. In the embodiment, dummy pixel electrodes 9b, which are simultaneously formed with the pixel electrodes 9a, are formed in a dummy pixel area 10c which overlaps the parting 27a in the peripheral area 10b of the element substrate 10.

The first oriented film 16 and the second oriented film 26 are formed of an inorganic oriented film (perpendicular oriented film) that includes a diagonally vapor-deposited film, such as $SiO_x$ (x<2), $SiO_2$, $TiO_2$, MgO, or $Al_2O_3$, and liquid crystal molecules, which include negative dielectric anisotropy that is used for the electro-optical layer 80, are aligned at an incline. Therefore, the liquid crystal molecules form a predetermined angle for the element substrate 10 and the counter substrate 20. In this manner, the electro-optical device 100 is formed as a liquid crystal apparatus in a vertical alignment (VA) mode.

In the element substrate 10, inter-substrate conduction electrodes 109 are formed in areas, which overlap the corner parts of the counter substrate 20 on the outer side of the seal material 107, in order to enable electrical conduction between the element substrate 10 and the counter substrate 20. In the inter-substrate conduction electrodes 109, inter-substrate conduction materials 109a, which include conductive particles, are arranged. The common electrode 21 of the counter substrate 20 is electrically connected to the side of the element substrate 10 via the inter-substrate conduction materials 109a and the inter-substrate conduction electrodes 109. Therefore, a common potential is applied to the common electrode 21 from the side of the element substrate 10.

In the electro-optical device 100 of the embodiment, the pixel electrode 9a and the common electrode 21 are formed of the ITO film (light-transmitting conductive film), and the electro-optical device 100 is formed as a transmission-type liquid crystal apparatus. In the electro-optical device 100, an image is displayed in such a way that light, which is incident on one-side substrate of the element substrate 10 and the counter substrate 20, is modulated when the light passes through the other-side substrate and is then emitted. In the embodiment, as illustrated by arrow L, an image is displayed in such a way that light, which is incident on the counter substrate 20, is modulated by the electro-optical layer 80 for each pixel when the light passes through the element substrate 10 and is emitted.

Detailed Configuration of Pixel

Figure 3:
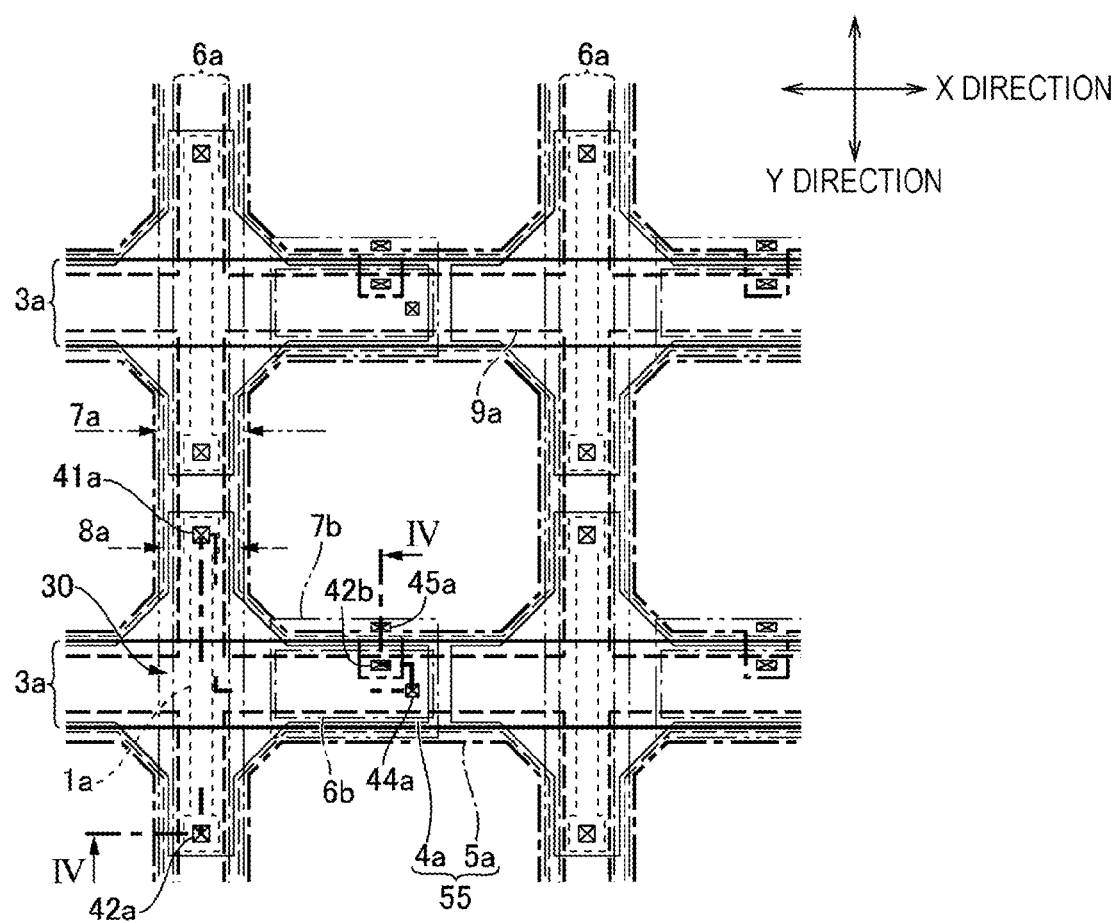
FIG. 3 is a plan view illustrating a plurality of pixels which are adjacent to each other in the electro-optical device to which the invention is applied.
Figure 4:
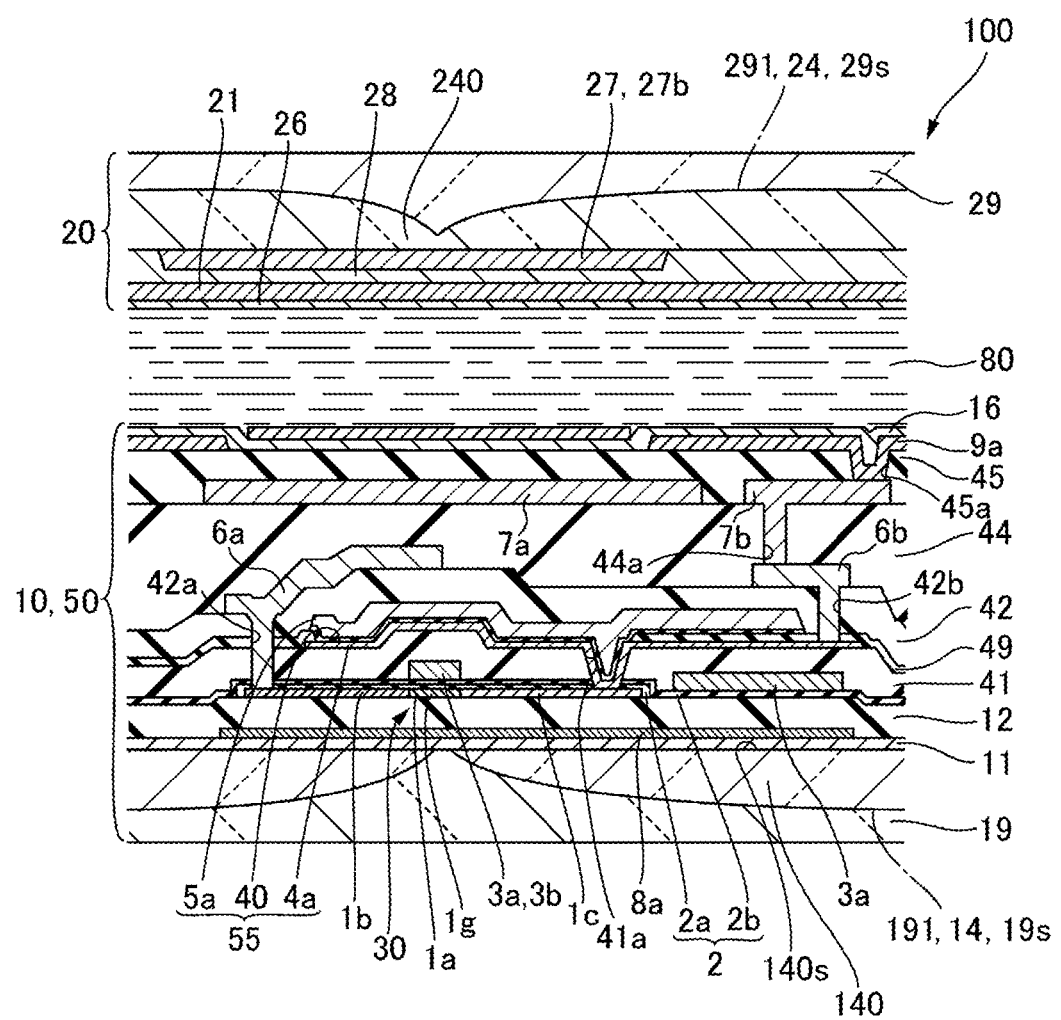
FIG. 4 is a sectional view illustrating the electro-optical device, taken along line IV-IV, to which the invention is applied.

FIG. 3 is a plan view illustrating a plurality of pixels which are adjacent to each other in the electro-optical device 100 to which the invention is applied. FIG. 4 is a sectional view of the electro-optical device 100 taken along line IV-IV (refer to FIG. 3) to which the invention is applied. Meanwhile, in FIG. 3, respective layers are indicated by the lines described below. In addition, in FIG. 3, with regard to layers which have terminals overlapping each other in plan view, the positions of the terminals are shifted such that the shapes or the like of the layers are easily understood.

Thin long broken line denotes a lower layer-side light-shield layer 8a

Thin and short dotted line denotes a semiconductor layer 1a

Thick solid line denotes a scan line 3a

Thin solid line denotes a drain electrode 4a

Thin one-dot chain line denotes a data line 6a and a relay electrode 6b

Thick one-dot chain line denotes a capacitance line 5a

Thin two-dot chain line denotes an upper layer-side light-shield layer 7a and a relay electrode 7b Thick broken line denotes a pixel electrode 9a As illustrated in FIG. 3, the pixel electrodes 9a are formed in the respective plurality of pixels on the surface of the element substrate 10, which faces the counter substrate 20, and the data lines 6a and the scan lines 3a are formed along inter pixel areas interposed by the adjacent pixel electrodes 9a. The inter-pixel areas extend horizontally and vertically, the scan lines 3a extend linearly along a first inter-pixel area of the inter-pixel areas, which extends in the X direction, and the data lines 6a extend linearly along a second inter-pixel area which extends in the Y direction. In addition, pixel switching elements 30 are formed to correspond to the intersections of the data lines 6a and the scan lines 3a. In the embodiment, the pixel switching elements 30 are formed by intersection areas between the data lines 6a and the scan lines 3a and the vicinity thereof. The capacitance lines 5a are formed in the element substrate 10, and a common potential Vcom is applied to the capacitance lines 5a. The capacitance lines 5a are formed in a lattice shape in such a manner to overlap the scan lines 3a and the data lines 6a. The upper layer-side light-shield layer 7a is formed on the upper layer side of the pixel switching elements 30, and the upper layer-side light-shield layer 7a extends to overlap the data lines 6a and the scan lines 3a. The lower layer-side light-shield layer 8a is formed on the lower layer side of the pixel switching elements 30, and the lower layer-side light-shield layer 8a extends to overlap the scan lines 3a and the data lines 6a.

As illustrated in FIG. 4, the substrate main body of the element substrate 10 is formed of a light-transmitting substrate 19, such as a quartz substrate or a glass substrate, and the pixel electrode 9a, the pixel switching element 30 for pixel switching, a first oriented film 16, and the like are formed on a surface (the side of one surface 19s which faces the counter substrate 20) of the substrate 19 on the side of the electro-optical layer 80, as will be described later. In addition, the substrate main body of the counter substrate 20 is formed of a light-transmitting substrate 29, such as the quartz substrate or the glass substrate, and the light-shield layer 27, the common electrode 21, the second oriented film 26, and the like are formed on the surface (one surface 29s which faces the element substrate 10) of the substrate 29 on the side of the electro-optical layer 80 of the substrate 29, as will be described below.

In the element substrate 10, a protective layer 11, which includes a silicon oxide film, is formed on the side of one surface 19s of the substrate 19, and the lower layer-side light-shield layer 8a, which includes a conductive film such as a conductive polysilicon film, a metal silicide film, a metal film or a metal compound film, is formed on the upper layer of the protective layer 11. In the embodiment, the lower layer-side light-shield layer 8a is formed of a light-shield film, such as tungsten silicide (WSi), tungsten, or titanium nitride, thereby preventing reflected light from being incident on the semiconductor layer 1a and preventing a malfunction attributable to photoelectric current from occurring in the pixel switching element 30 in a case in which light that passes through the electro-optical device 100 is reflected in another member. There is a case in which the lower layer-side light-shield layer 8a is formed as the scan lines. In this case, the lower layer-side light-shield layer 8a is formed to enable electrical conduction between a gate electrode 3b, which will be described later, and the lower layer-side light-shield layer 8a.

A light-transmitting insulation film 12, which includes a silicon oxide film, is formed on the upper layer side of the lower layer-side light-shield layer 8a on the side of one surface 19s of the substrate 19, and the pixel switching element 30, which includes the semiconductor layer 1a, is formed on the upper layer side of the insulation film 12. The pixel switching element 30 includes the semiconductor layer 1a, in which a long-side direction faces the extension direction of the data line 6a, and the gate electrode 3b, which extends in a direction orthogonal to the longitudinal direction of the semiconductor layer 1a and overlaps the central part of the longitudinal direction of the semiconductor layer 1a. In the embodiment, the gate electrode 3b includes a part of the scan line 3a. The pixel switching element 30 includes a light-transmitting gate insulation layer 2 between the semiconductor layer 1a and the gate electrode 3b. The semiconductor layer 1a includes a channel area 1g, which faces the gate electrode 3b through the gate insulation layer 2, and includes a source area 1b and a drain area 1c on both sides of the channel area 1g. In the embodiment, the pixel switching element 30 has an LDD structure. Accordingly, the source area 1b and the drain area 1c respectively include low concentration areas on both sides of the channel area 1g and include high-concentration areas in areas which are adjacent to the channel area 1g on a side opposite to the low concentration areas.

The semiconductor layer 1a is formed of a polysilicon film (polycrystalline silicon film) or the like. The gate insulation layer 2 includes a two-layered structure which includes a first gate insulation layer 2a that is formed of a silicon oxide film acquired by performing thermal oxidation on the semiconductor layer 1a, and a second gate insulation layer 2b that is formed of a silicon oxide film formed by a decompression CVD method or the like. The gate electrode 3b and the scan line 3a include a conductive film such as a conductive polysilicon film, a metal silicide film, a metal film, or a metal compound film.

A light-transmitting inter-layer insulation film 41, which includes the silicon oxide film, is formed on the upper layer side of the gate electrode 3b, and the drain electrode 4a is formed on the upper layer of the inter-layer insulation film 41. The drain electrode 4a includes the conductive film such as the conductive polysilicon film, the metal silicide film, the metal film, or the metal compound film. The drain electrode 4a is formed such that a part of the drain electrode 4a overlaps the drain area 1c of the semiconductor layer 1a and the drain electrode 4a is electrically connected to the drain area 1c through a contact hole 41a which passes through the inter-layer insulation film 41 and the gate insulation layer 2.

A light-transmitting etching stopper layer 49 and a light-transmitting dielectric layer 40, which include a silicon oxide film or the like, are formed on the upper layer side of the drain electrode 4a, and the capacitance line 5a is formed on the upper layer side of the dielectric layer 40. It is possible to use a silicon compound, such as a silicon oxide film or a silicon nitride film, as the dielectric layer 40. In addition, it is possible to use a dielectric layer, which has a high dielectric constant, such as an aluminum oxide film, a titanium oxide film, a tantalum oxide film, a niobium oxide film, a hafnium oxide film, a lanthanum oxide film, or a zirconium oxide film. The capacitance line 5a includes a conductive film, such as a conductive polysilicon film, a metal silicide film, a metal film, or a metal compound film. The capacitance line 5a overlaps the drain electrode 4a through the dielectric layer 40 and forms maintenance capacitance 55.

A light-transmitting inter-layer insulation film 42, which includes a silicon oxide film or the like, is formed on the upper layer side of the capacitance line 5a, and the data line 6a and the relay electrode 6b are formed by the same conductive film on the upper layer side of the inter-layer insulation film 42. The data line 6a and the relay electrode 6b include the conductive film such as the conductive polysilicon film, the metal silicide film, the metal film or the metal compound film. The data line 6a is electrically connected to the source area 1b through the contact hole 42a which passes through the inter-layer insulation film 42, the etching stopper layer 49, the inter-layer insulation film 41, and the gate insulation layer 2. The relay electrode 6b is electrically connected to the drain electrode 4a through the contact hole 42b which passes through the inter-layer insulation film 42 and the etching stopper layer 49.

A light-transmitting inter-layer insulation film 44, which includes the silicon oxide film, is formed on the upper layer side of the data line 6a and the relay electrode 6b, and the upper layer-side light-shield layer 7a and the relay electrode 7b are formed by the same conductive film on the upper layer side of the inter-layer insulation film 44. The surface of the inter-layer insulation film 44 is flattened. The upper layer-side light-shield layer 7a and the relay electrode 7b include the conductive film such as the conductive polysilicon film, the metal silicide film, the metal film, or the metal compound film. The relay electrode 7b is electrically connected to the relay electrode 6b through a contact hole 44a which passes through the inter-layer insulation film 44. The upper layer-side light-shield layer 7a extends to overlap the data line 6a and functions as a light-shield layer. Meanwhile, the upper layer-side light-shield layer 7a may be electrically connected to the capacitance line 5a to be used as a shield layer.

A light-transmitting inter-layer insulation film 45, which includes the silicon oxide film or the like, is formed on the upper layer side of the upper layer-side light-shield layer 7a and the relay electrode 7b, and the pixel electrode 9a, which includes the ITO film, is formed on the upper layer side of the inter-layer insulation film 45. The contact hole 45a, which reaches the relay electrode 7b, is formed in the inter-layer insulation film 45, and the pixel electrode 9a is electrically connected to the relay electrode 7b through the contact hole 45a. As a result, the pixel electrode 9a is electrically connected to the drain area 1c through the relay electrode 7b, the relay electrode 6b, and the drain electrode 4a. The surface of the inter-layer insulation film 45 is flattened. The light-transmitting first oriented film 16, which includes a polyimide or an inorganic oriented film, is formed on the surface side of the pixel electrode 9a.

In the counter substrate 20, the light-shield layer 27, a protective layer 28, which includes the silicon oxide film or the like, and the common electrode 21, which includes the light-transmitting conductive film such as the ITO film, are formed on the surface (one surface 29s which faces the element substrate 10) of the light-transmitting substrate 29 (light-transmitting substrate), such as the quartz substrate or the glass substrate, on the side of the electro-optical layer 80, and the light-transmitting second oriented film 26, which includes the polyimide and the inorganic oriented film, is formed to cover the common electrode 21. In the embodiment, the common electrode 21 includes the ITO film.

Configuration of Lens 24 on Side of Counter Substrate 20

Figure 5:
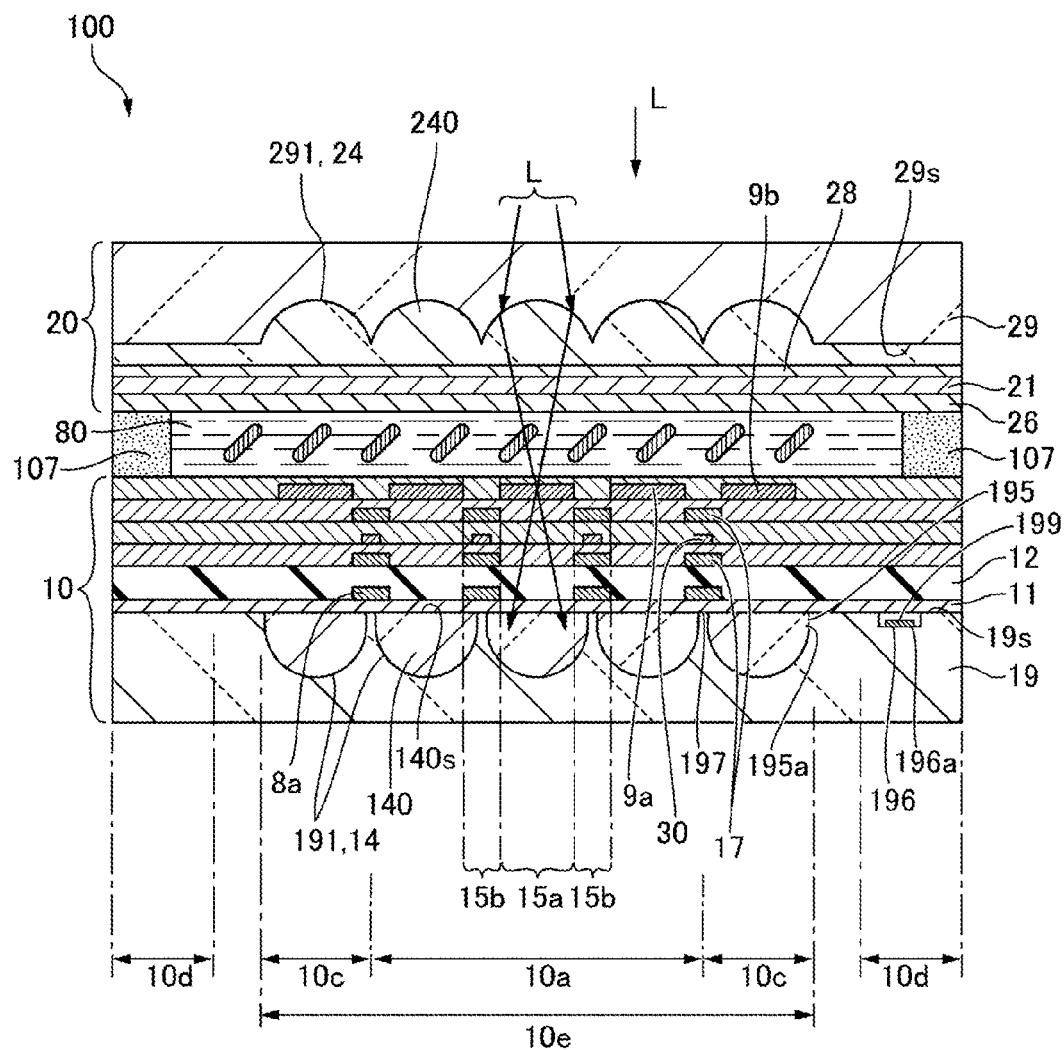
FIG. 5 is an explanatory view schematically illustrating the sectional configurations of the lenses of an electro-optical device according to a first embodiment of the invention.
Figure 6:
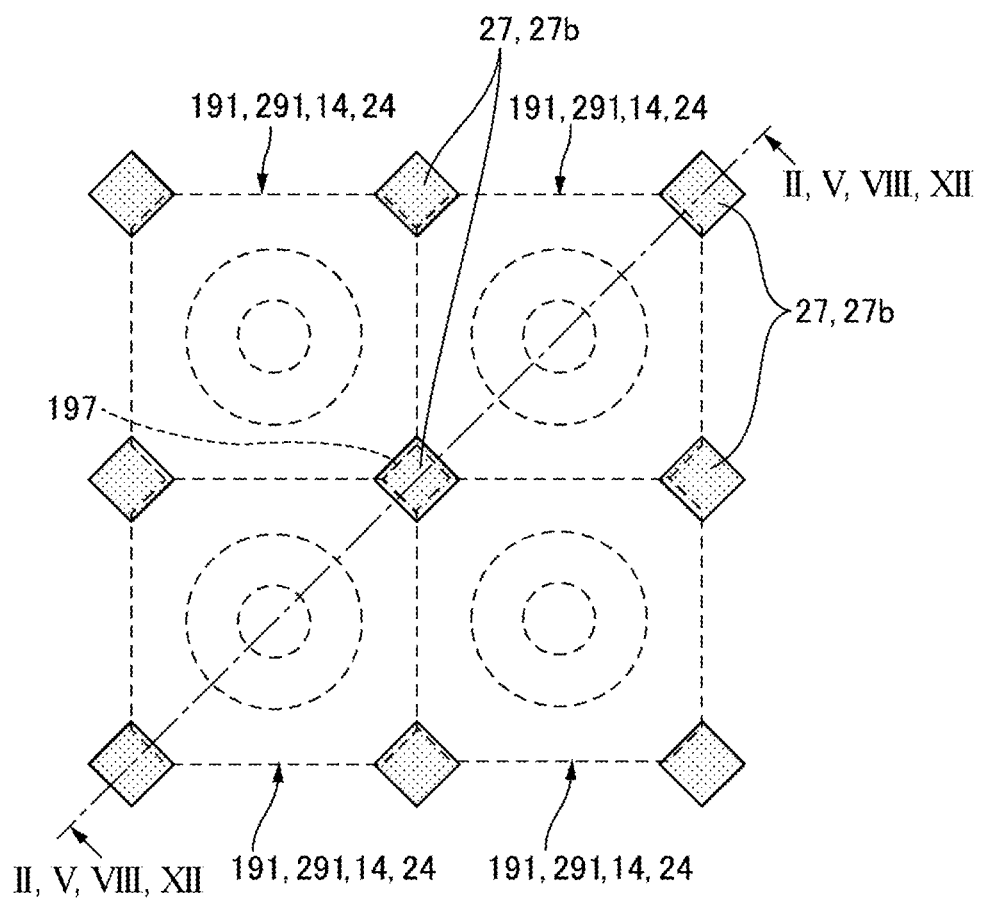
FIG. 6 is an explanatory view illustrating a planar positional relationship between the lenses and the light-shield layer of the electro-optical device according to the first embodiment of the invention.

FIG. 5 is a view corresponding to FIG. 4 and is an explanatory view schematically illustrating the sectional configurations of lenses 14 and 24 of the electro-optical device 100 according to the first embodiment of the invention. FIG. 6 is an explanatory view illustrating a planar positional relationship between the lenses 14 and 24 and the light-shield layer 27b of the electro-optical device 100 according to the first embodiment of the invention.

As illustrated in FIG. 5, in the element substrate 10, the light-shield layer 17 and the pixel switching element 30, which include the data line 6a and the like, are formed on the side of one surface 19s of the substrate 19. Light does not pass through the light-shield layer 17 and the pixel switching element 30. Therefore, in the element substrate 10, from among the areas which overlap the pixel electrodes 9a in a plan view, areas, which overlap the light-shield layer 17 and the pixel switching elements 30 in a plan view, and areas, which overlap areas interposed between adjacent pixel electrodes 9a in a plan view, become light-shield areas 15b through which light does not pass. In contrast, from among the areas which overlap the pixel electrodes 9a in a plan view, an area which does not overlap the light-shield layer 17 and the pixel switching elements 30 in a plan view is an opening area 15a (light transmission areas) through which light passes. Accordingly, only light which passes through the opening area 15a contributes to display an image, and light which faces the light-shield areas 15b does not contribute to display the image.

Here, in the embodiment, a plurality of lenses 24, which respectively overlap the plurality of pixel electrodes 9a in a plan view with one-to-one relationship, are formed in the counter substrate 20. The lenses 24 guide light to the opening area 15a of the element substrate 10. Therefore, it is possible to increase utilization efficiency of light. In addition, the lenses 24 cause a part of light, which is incident into the electro-optical layer 80, to be collimated. Since the inclination of the optical axis of light which is incident into the electro-optical layer 80 is small, it is possible to reduce phase deviation in the electro-optical layer 80, and thus it is possible to suppress the decrease of transmittance and contrast. In particular, in the embodiment, the electro-optical device 100 is formed as the liquid crystal apparatus in the VA mode, and thus the decrease or the like of contrast easily occurs according to the inclination of the optical axis of light which is incident into the electro-optical layer 80. However, according to the embodiment, it is difficult for the decrease in contrast or the like to occur.

As illustrated in FIG. 6, the lenses 24 are arranged such that at least some parts of the adjacent lenses 24 come into contact with each other. In the embodiment, the adjacent lenses 24 come into contact with each other over approximately the whole circumference, and the light-shield layer 27b, illustrated in FIG. 2, is formed in an area which overlaps an area surrounded by the four lenses 24 in a plan view. Meanwhile, FIGS. 2 and 5 correspond to cross sections taken along line II-II (V-V) of FIG. 6. Here, in FIG. 5, the light-shield layer 27b is not illustrated.

In a case in which the counter substrate 20 is formed, a plurality of lens surfaces 291, which include concave surfaces that overlap the plurality of respective pixel electrodes 9a in a plan view with one-to-one relationship, are formed on one surface 29s of the substrate 29. In addition, a light-transmitting lens layer 240 and the light-transmitting protective layer 28 are sequentially laminated on one surface 29s of the substrate 29, and the common electrode 21 is formed on the protective layer 28 on a side opposite to the substrate 29. The substrate 29 and the lens layer 240 have different refractive indexes, and lens surfaces 291 and the lens layer 240 form the lenses 24. In the embodiment, the refractive index of the lens layer 240 is larger than the refractive index of the substrate 29. For example, the substrate 29 includes a quartz substrate (silicon oxide, SiO2) and a refractive index is 1.48. In contrast, the lens layer 240 includes a silicon oxynitride film (SiON) and the refractive index is included between 1.58 and 1.68. Therefore, the lenses 24 have power to converge light from light sources.

Configuration of Lenses 14 on Side of Element Substrate 10

As illustrated in FIG. 5, in the embodiment, the element substrate 10 is formed as a lens array substrate 50 on which a plurality of lenses 14, which respectively overlap the plurality of pixel electrodes 9a in a plan view with one-to-one relationship, are formed, similarly to the counter substrate 20. The lenses 24 guide light to the opening area 15a of the element substrate 10. The lenses 14 cause light, which is incident from the element substrate 10, to be collimated. Therefore, according to the embodiment, it is difficult for the decrease or the like of contrast to occur. As illustrated in FIG. 6, the lenses 14 are arranged to contact at least parts of adjacent lenses 14, similarly to the lenses 24. In the embodiment, the adjacent lenses 14 come into contact with each other over approximately the whole circumference.

In a case in which the element substrate 10 (lens array substrate 50) illustrated in FIG. 5 is formed, a plurality of lens surfaces 191, which include concave surfaces that overlap the plurality of respective pixel electrodes 9a in a plan view with one-to-one relationship, are formed on one surface 19s of the substrate 19. In addition, a light-transmitting lens layer 140 is laminated to cover the lens surfaces 191 on one surface 19s of the substrate 19, and the protective layer 11, the lower layer-side light-shield layer 8a, the insulation film 12, and the like are sequentially formed on the lens layer 140 on a side opposite to the substrate 19. The substrate 19 and the lens layer 140 have different refractive indexes, and the lens surfaces 191 and the lens layer 140 form the lenses 14. In the embodiment, the refractive index of the lens layer 140 is larger than the refractive index of the substrate 19. For example, substrate 19 includes the quartz substrate and the refractive index is 1.48. In contrast, the lens layer 140 includes a silicon oxynitride film and the refractive index is included in a range between 1.58 and 1.68. Therefore, the lenses 14 have power to diffuse light. Otherwise, the lenses 14 enable light to be parallel light through adjustment of the shapes or the like of the concave surfaces.

In the embodiment, lens surfaces 191 includes concave surfaces, which are recessed toward another side surface 19t of the substrate 19 from bottoms 195a of first recess sections 195 which are formed in a recess section forming step ST1 which will be described later. The side surfaces of the first recess sections 195 are schematically perpendicular to one surface 19s of the substrate 19, and the lens surfaces 191 include concave surfaces which are recessed in a spherical shape from the bottoms 195a of the first recess sections 195. Therefore, in the first recess sections 195, spots, at which the side surface which is approximately perpendicular to the substrate 19 is changed over to the concave surface in a spherical shape, correspond to the bottoms 195a of the first recess sections 195. Here, since the first recess sections 195 are provided in respective areas in which the plurality of lens surfaces 191 are formed, the side surfaces of the first recess sections 195 remain on the plurality of respective lens surfaces 191. However, in the embodiment, since the adjacent lenses 14 come into contact with each other over approximately the whole circumference, the first recess sections 195 are formed as an integral recess section which is connected throughout all the areas in which the lens surfaces 191 are formed. Therefore, the outer periphery of the first recess sections 195 overlaps the outer periphery of the area (lens forming area 10e) in which the plurality of lens surfaces 191 are formed.

The lens layer 140 is selectively provided inside the lens surfaces 191 (concave surfaces) and the first recess sections 195. The surface 140s of the lens layer 140 on the side opposite to the substrate 19 forms a planar surface which is contiguous to the outside area 10d that is positioned on the outer side of the lens surfaces 191 on one surface 19s of the substrate 19. Therefore, the lens layer 140 is not formed on the outside area 10d of one surface 19s of the substrate 19, and one surface 19s of the substrate 19 is exposed. In addition, the lens layer 140 is not formed in the spaces 197 between the adjacent lens surfaces 191 in a direction in which line V-V of FIG. 6 extends, and one surface 19s of the substrate 19 is exposed. In addition, one surface 19s of the substrate 19 which is exposed in the spaces 197 between the adjacent lens surfaces 191 forms a planar surface which is contiguous to the surface 140s on the side opposite to the substrate 19 of the lens layer 140.

In the embodiment, a second recess section 196, which is shallower than the bottoms of the lens surfaces 191, is formed on one surface 19s of the substrate 19 on the outside of the display area 10a. A mark 199, which is an index of the quantity of removal of the lens layer 140, is formed at the bottom 196a of the second recess section 196. The side surface of the second recess section 196 is generally perpendicular to one surface 19s of the substrate 19. The depth of the second recess section 196 is equal to that of the first recess sections 195, and the bottom 196a of the second recess section 196 is located at the depth which is the same as the bottoms 195a of the first recess sections 195. In addition, the inside of the second recess section 196 is filled with the lens layer 140, and the lens layer 140 which fills the inside of the second recess section 196 forms a planar surface in which the surface 140s on the side opposite to the substrate 19 is contagious to the outside area 10d that is positioned on the outer side of the second recess section 196.

Method of Manufacturing Lens Array Substrate 50 and Electro-Optical Device 100

Figure 7:
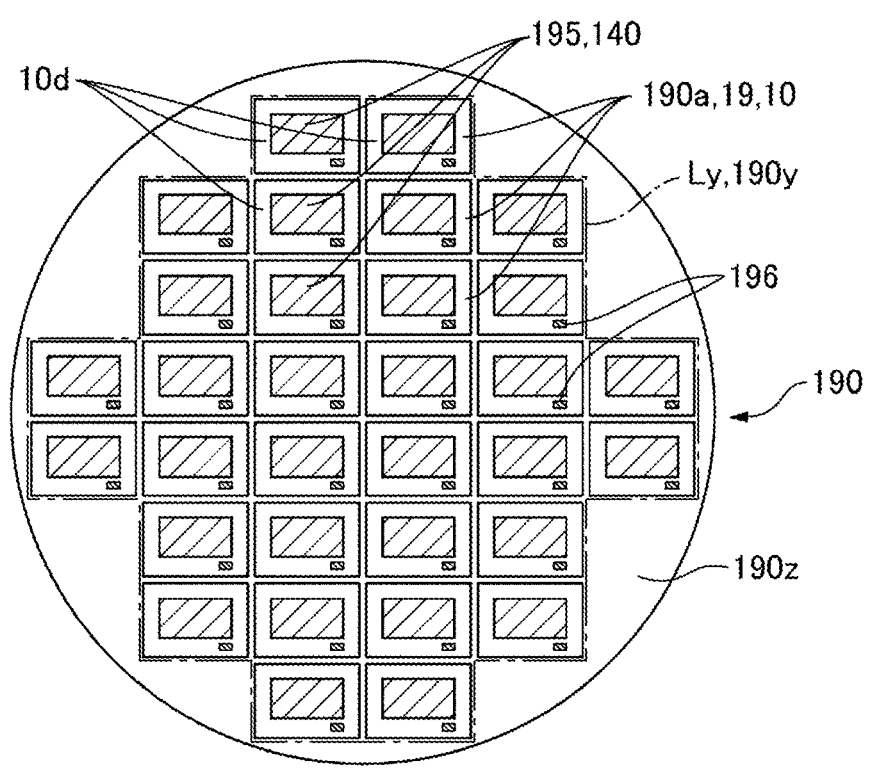
FIG. 7 is an explanatory view illustrating a mother substrate which is used to manufacture the element substrate of the electro-optical device according to the first embodiment of the invention.
Figure 8:
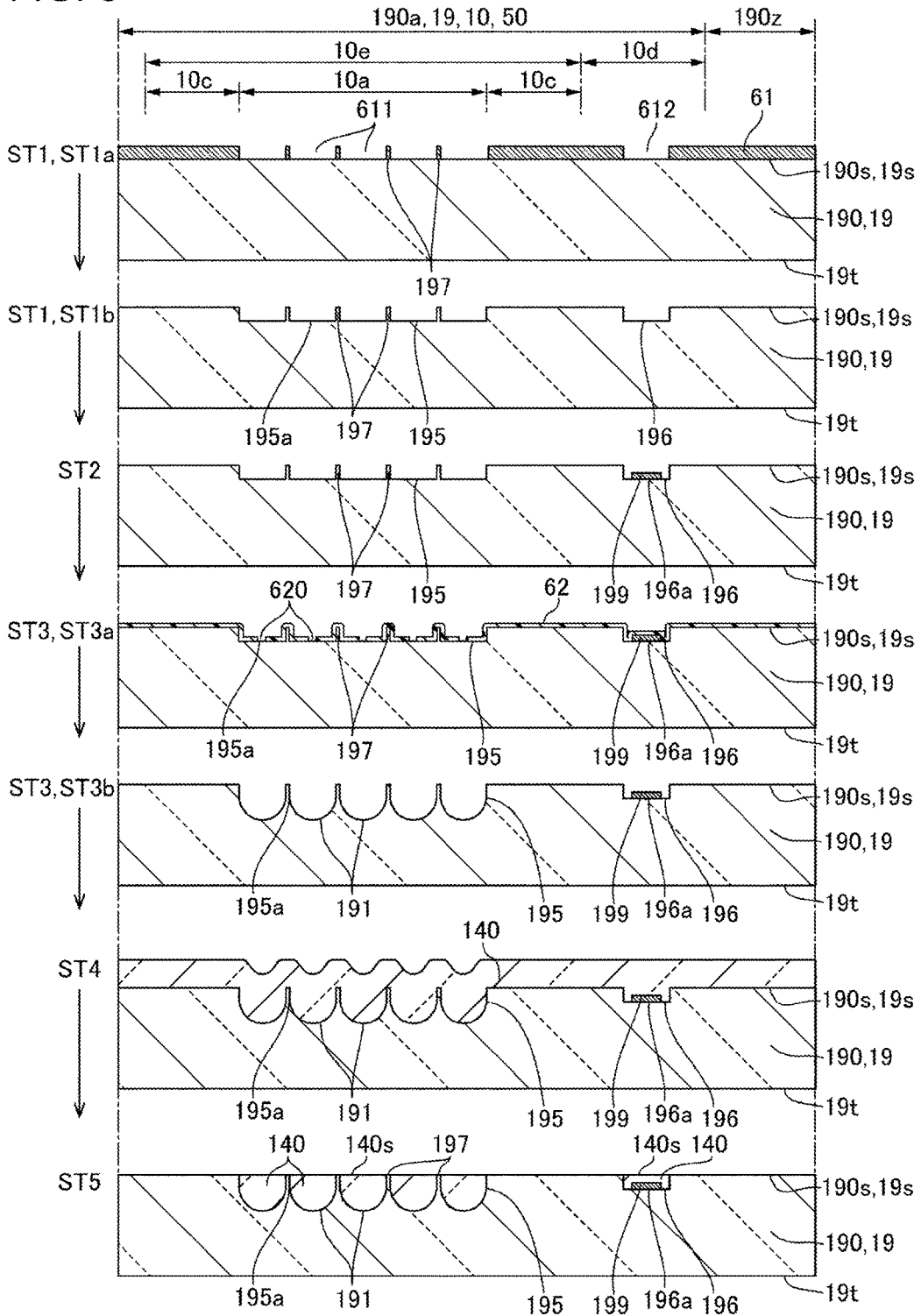
FIG. 8 is a sectional view illustrating steps which show a method of manufacturing the element substrate of the electro-optical device according to the first embodiment of the invention.
Figure 9:
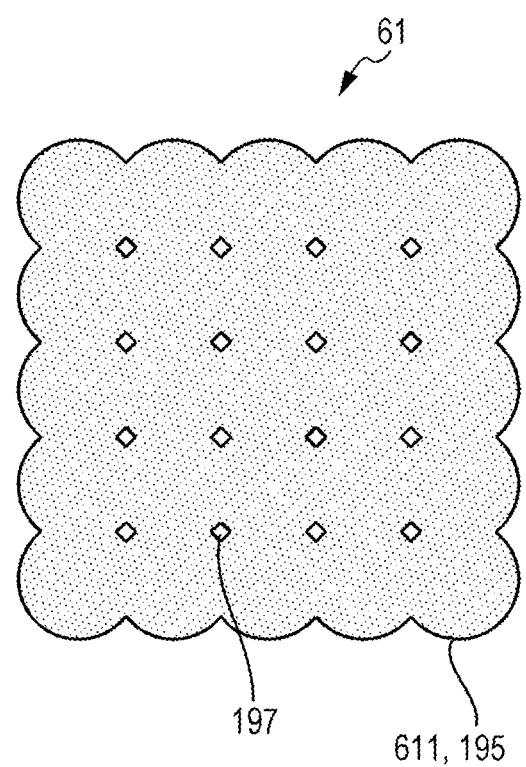
FIG. 9 is an explanatory view illustrating the first opening section of a first etching mask which is used in an etching step illustrated in FIG. 8.

FIG. 7 is an explanatory view illustrating a mother substrate 190 which is used to manufacture the element substrate 10 of the electro-optical device 100 according to the first embodiment of the invention. FIG. 8 is a sectional view illustrating steps which show a method of manufacturing the element substrate 10 of the electro-optical device 100 according to the first embodiment of the invention. FIG. 9 is an explanatory view illustrating a first opening section 611 of a first etching mask 61 which is used in an etching step ST1b illustrated in FIG. 8. Meanwhile, FIG. 8 corresponds to a cross section taken along line VIII-VIII of FIG. 6. In addition, FIG. 9 schematically illustrates the first etching mask 61.

As illustrated in FIG. 7, in a case in which the element substrate 10 according to the embodiment is manufactured, the mother substrate 190, which includes a quartz substrate that is larger than the substrate 19, is used. The mother substrate 190 includes a plurality of areas 190a which are cut off as the element substrates 10 (substrates 19). After the lenses 14, the pixel switching elements 30, the pixel electrodes 9a, and the like, which have been described with reference to FIG. 2, are formed on the areas 190a, the mother substrate 190 is cut off along the areas 190a, thereby acquiring the element substrate 10 of a single-unit size. Accordingly, in the mother substrate 190, an area (area which is surround by a dashed line Ly), in which the plurality of element substrates 10 are cut, is an available area 190y, and the other area is a removal material area 190z which is removed in a cutting step.

In a case in which the element substrate 10 is manufactured using the mother substrate 190 as above, the following steps and the like are performed in the embodiment.
Recess section forming step ST1
Mark forming step ST2
Lens surface forming step ST3
Lens layer forming step ST4
Flattening step ST5
Pixel forming step First, in the recess section forming step ST1 illustrated in FIG. 8, first recess sections 195 are formed on one surface 190s (one surface 19s) of the mother substrate 190 (substrate 19). More specifically, in a mask forming step ST1a, the etching mask 61 is formed on one surface 190s of the mother substrate 190. In the embodiment, an area (display area 10a) in which the pixel electrodes 9a are formed and an area in which a part of the dummy pixel area 10c is formed are included in a lens forming area 10e, and an area which includes at least the lens forming area 10e forms the first opening sections 611 in the etching mask 61. In the embodiment, an area which is approximately the same as the lens forming area 10e forms the first opening sections 611. In addition, in the first etching mask 61, a second opening section 612 is formed in an area which overlaps a part of the outside area 10d. Here, the first opening sections 611 are formed to overlap the respective areas, in which the plurality of lens surfaces 191 are formed, as illustrated in FIG. 9. Therefore, the first opening sections 611 are not formed in areas corresponding to the spaces 197 between the adjacent lens surfaces 191.

Subsequently, in the etching step ST1b illustrated in FIG. 8, one surface 190s of the mother substrate 190 is etched from the first and second opening sections 611 and 612 of the first etching mask 61, and the first recess sections 195 and the second recess section 196 are formed. Thereafter, the first etching mask 61 is removed. As described above, in FIG. 7, the first recess sections 195 are independently formed in the display area 10a, which is filled with oblique lines, in the area 190a in which the plurality of element substrates 10 are cut. In addition, in FIG. 7, the second recess section 196 is formed on the outside of the display area 10a, which is filled with oblique lines, in the area 190a in which the plurality of element substrates 10 are cut. In the etching step ST1b, either wet etching or dry etching may be used. In the embodiment, the dry etching is performed in the etching step ST1b. Therefore, the side surfaces of the first recess sections 195 and the second recess section 196 are generally perpendicular to one surface 19s of the substrate 19. In addition, the bottoms 195a of the first recess sections 195 and the bottom 196a of the second recess section 196 are generally formed to be horizontal to one surface 19s of the substrate 19.

Subsequently, in the mark forming step ST2 illustrated in FIG. 8, the mark 199 is formed at the bottom 196a of the second recess section 196. In the embodiment, patterning is performed after a light-shield layer, such as amorphous silicon, polysilicon, tungsten silicide, molybdenum, or tantalum, is formed, and the mark 199 is formed.

Subsequently, in the lens surface forming step ST3 illustrated in FIG. 8, the plurality of lens surfaces 191, which includes concave surfaces, are formed at the bottoms 195a of the first recess sections 195. Specifically, in a mask forming step ST3a, a second etching mask 62, in which areas overlapping the centers of the lens surfaces 191 in a plan view become opening sections 620, is formed on one surface 190s of the mother substrate 190. The second etching mask 62 includes, for example, polysilicon which is formed by a thermal CVD method or the like. The second etching mask 62 has an advantage in that coverage for steps is excellent. Subsequently, in an etching step ST3b, isotropy etching is performed in a range from the opening sections 620 to the bottoms 195a of the first recess sections 195. As a result, on one surface 190s of the mother substrate 190, the lens surfaces 191, which include concave surfaces in spherical shapes centering on the opening sections 620, are formed at the bottoms 195a of the first recess sections 195. Thereafter, the second etching mask 62 is removed. In the etching step ST3b, either the wet etching and the dry etching may be used. In the embodiment, in the etching step ST3b, the wet etching is performed based on soaking or spindle etching performed on etchant which includes hydrofluoric acid. Meanwhile, according to a material which forms the mark 199, the second etching mask 62 may be formed after the mark 199 is covered by a protective layer such as an oxide film.

Subsequently, in the lens layer forming step ST4 illustrated in FIG. 8, the light-transmitting lens layer 140 is formed on one surface 190s of the mother substrate 190 in order to fill the insides of the first recess sections 195 and the second recess section 196. As a result, the lens layer 140 is also formed on one surface 19s of the substrate 19. In the embodiment, the lens layer 140 includes a silicon nitride film (SiON) which is formed by the plasma CVD or the like. Accordingly, in a case in which the plasma CVD is performed, for example, monosilane ($SiH_4$) and nitric monoxide ($N_2O$) are used as source gas. Meanwhile, there is a case in which ammonia ($NH_3$) is used as the source gas.

Subsequently, in the flattening step ST5 illustrated in FIG. 8, the lens layer 140 is flattened from a side opposite to the mother substrate 190 (substrate 19), and the surface 140s of the lens layer 140 on the side opposite to the mother substrate 190 is caused to be a planar surface which is contiguous to the outside area 10d that is positioned on the outside of the first recess sections 195 and the second recess section 196 on one surface 190s of the mother substrate 190. As a result, the lens layer 140 is removed from areas other than the inside of the lens surfaces 191 and the inside of the second recess section 196. Therefore, as illustrated in an area which is filled with oblique lines in FIG. 7, the lens layers 140 are independently formed in the respective areas in which the plurality of element substrates 10 are cut. In the flattening step ST5, Chemical Mechanical Polishing (CMP) or etch back is used as a flattening process. In the embodiment, a CMP process is used in the flattening step ST5. In this case, the mark 199 is monitored, the quantity of removal (polishing quantity) of the lens layer 140 is monitored, and the lens layer 140 is polished such that the mark 199 remains. More specifically, the thickness of the lens layer 140, which covers the mark 199, is measured, and the end point of the flattening step ST5 is determined based on the result of the measurement.

In the embodiment, flattening is performed to the midst of the first recess sections 195 and the second recess section 196 in the depth direction. Therefore, only some parts of the first recess sections 195 and the second recess section 196 remain, and the lens surfaces 191 (lenses 14), which are recessed toward another side surface 19t of the substrate 19 from the remaining bottoms 195a of the first recess sections 195, are provided. In addition, the mark 199 remains at the bottom 196a of the second recess section 196, and the lens layer 140 remains inside the second recess section 196.

Thereafter, as illustrated in FIG. 4, after the protective layer 11, which includes the silicon oxide film or the like, is formed on the side of one surface 19s of the substrate 19, the pixel switching elements 30, the pixel electrodes 9a, and the like are formed over the lenses 14 on the side opposite to the substrate 19 in the pixel forming step. Thereafter, after the mother substrate 190 is bonded to the counter substrate 20, the electro-optical layer 80 is injected between the mother substrate 190 and the counter substrate 20, and then the mother substrate 190 is cut.

Main Advantage of Embodiment

As described above, in the method of manufacturing the element substrate 10 which is used for the electro-optical device 100 according to the embodiment, the first recess sections 195 are formed on one surface 19s of the substrate 19 in the recess section forming step ST1, and then the plurality of lens surfaces 191, which include the concave surfaces, are provided at the bottoms 195a of the first recess sections 195 in the lens surface forming step ST3. In addition, the light-transmitting lens layer 140 is provided such that the inner sides of the first recess sections 195 are filled in the lens layer forming step ST4, and then flattening is performed while the lens layer 140 is removed in the flattening step ST5. Here, the surface 140s of the lens layer 140 on the side opposite to the substrate 19 is a planar surface which is contiguous to the outside area 10*d* that is positioned on the outer side of the first recess sections 195 on one surface 19*s* of the substrate 19. Therefore, the lens layer 140 does not remain in the outside area 10*d*, and thus an area in which the lens layer 140 is formed is narrow. Therefore, even though high temperature is applied to the lens layer 140 in a step which is performed after the lens layer 140 is formed, it is difficult for stress to be concentrated on specific spots of the lens layer 140. For example, even though, after the lens layer 140 is formed, high temperature is applied to the lens layer 140 in the step in which the semiconductor layer 1*a* and the gate insulation layer 2 are formed, it is difficult for stress to be concentrated on the specific spots of the lens layer 140. Therefore, it is difficult for cracks to be generated in the lens layer 140. Further, is possible to suppress the generation of a problem in that the lens layer 140 is exfoliated from the substrate 19 attributable to the cracks. In addition, in the flattening step ST5, the lens layer 140, which is formed in the outside area 10*d* that is outer side of the first recess sections 195, may be removed, and thus the thickness of the substrate 19, which corresponds to some parts of the first recess sections 195, may be removed. Therefore, it is difficult for a situation in which some parts of the lens surfaces 191 (concave surfaces) are removed to be generated. Therefore, it is possible to suitably form the lens surfaces 191.

In addition, in the recess section forming step ST1, the second recess section 196 is formed on one surface 19*s* of the substrate 19 simultaneously with the first recess sections 195, and the mark 199 is formed at the bottom 196*a* of the second recess section 196. Therefore, in the flattening step ST5, it is possible to monitor the quantity of removal of the lens layer 140 by the mark 199, and thus it is difficult for a situation in which the lens surfaces 191 (concave surfaces) are polished to be generated. Therefore, it is possible to suitably form the lens surfaces 191.

In addition, at least some parts of the adjacent lens surfaces 191 of the plurality of lens surfaces 191 are connected. Particularly, in the embodiment, the plurality of respective lens surfaces 191 are connected to the lens surfaces 191 which are positioned therearound over approximately the whole circumference. Therefore, it is possible to increase the quantity of light which is incident on the lens surfaces 191.

Second Embodiment

Figure 10:
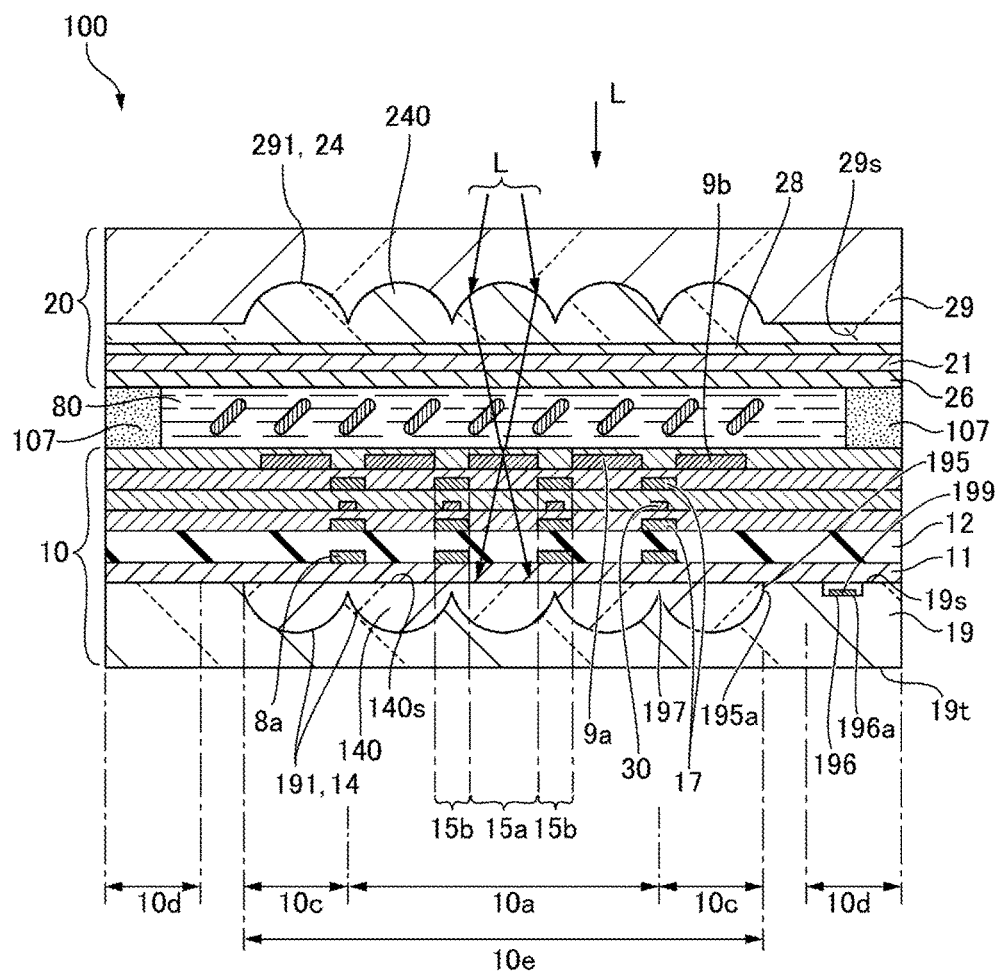
FIG. 10 is an explanatory view schematically illustrating the sectional configurations of the lenses of an electro-optical device according to a second embodiment of the invention.
Figure 11:
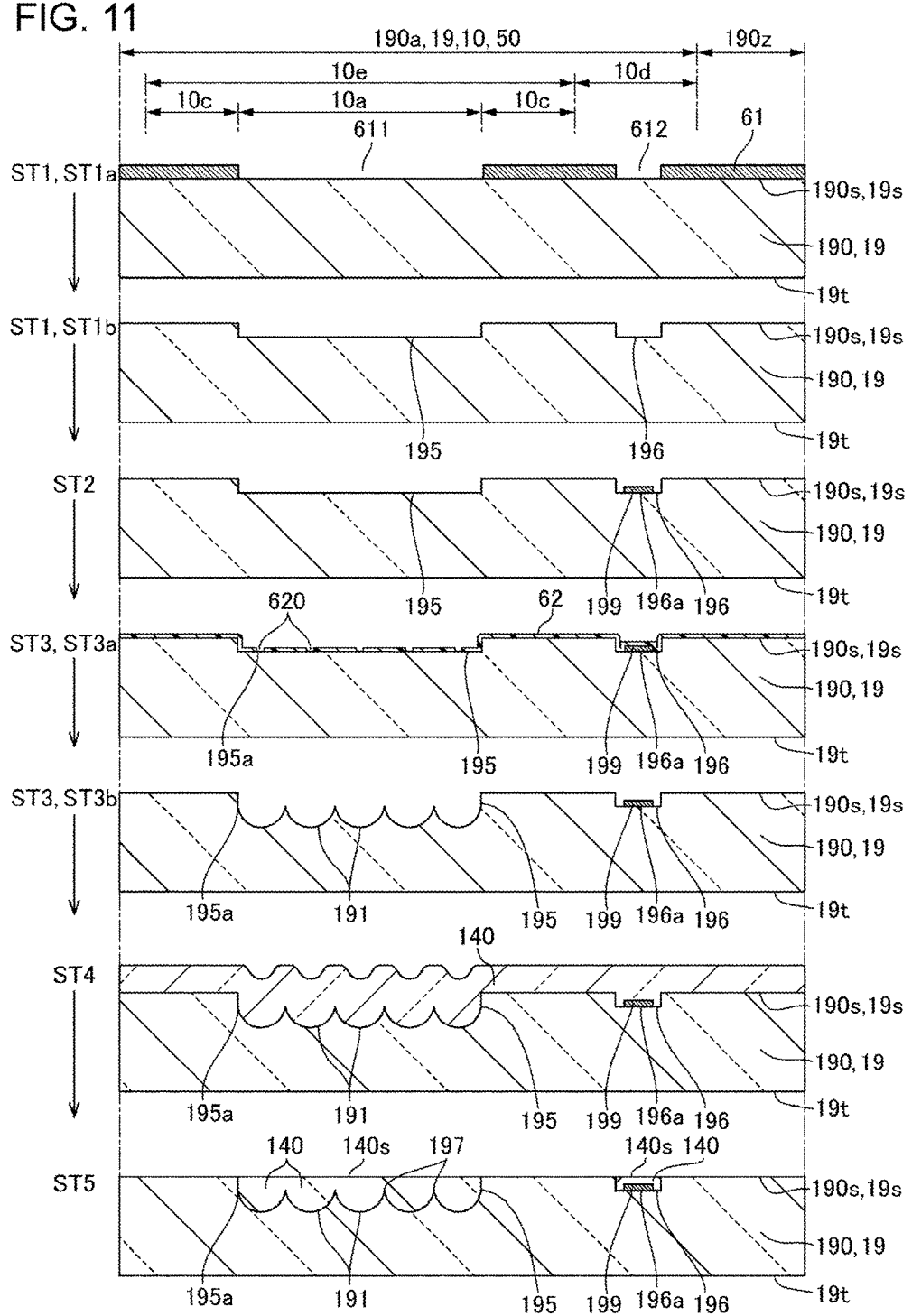
FIG. 11 is a cross-sectional view illustrating steps which shows a method of manufacturing the element substrate of the electro-optical device according to the second embodiment of the invention.
Figure 12:
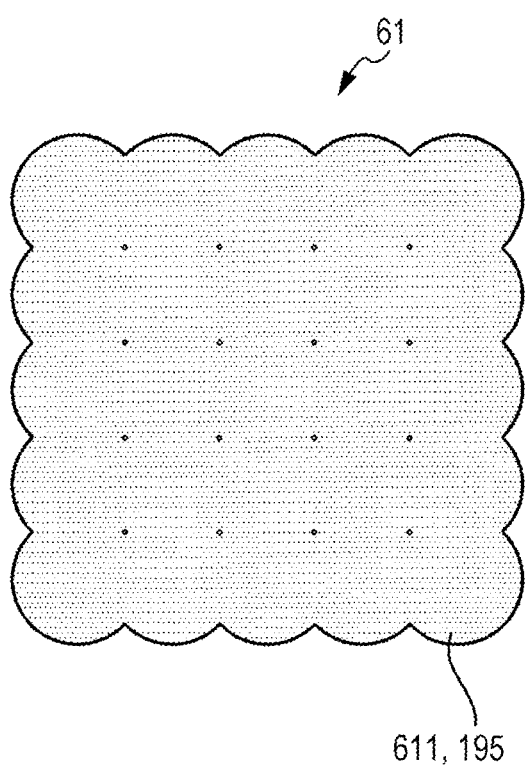
FIG. 12 is an explanatory view illustrating the first opening sections of the first etching mask which is used in an etching step illustrated in FIG. 11.

FIG. 10 is an explanatory view schematically illustrating sectional configurations of the lenses 14 and 24 of an electro-optical device 100 according to a second embodiment of the invention. FIG. 11 is a cross-sectional view illustrating steps which show a method of manufacturing the element substrate 10 of the electro-optical device 100 according to the second embodiment of the invention. FIG. 12 is an explanatory view illustrating the first opening sections 611 of the first etching mask 61 which is used in the etching step ST1*b* illustrated in FIG. 11. Meanwhile, since the basic configuration of the embodiment is similar to that of the first embodiment, the same reference symbols are attached to common parts and the description thereof will not be repeated. In addition, FIG. 12 corresponds to a cross section taken along line XII-XII illustrated in FIG. 6. In addition, FIG. 12 schematically illustrates the first etching mask 61.

As illustrated in FIG. 10, in the embodiment, the element substrate 10 is formed as a lens array substrate 50 in which the plurality of lenses 14, which respectively overlap the plurality of pixel electrodes 9*a* in a plan view with one-to-one relationship, similarly to the first embodiment. In the element substrate 10 (lens array substrate 50), the plurality of lens surfaces 191, which includes concave surfaces, are formed on one surface 19*s* of the substrate 19, and the lens surfaces 191 are covered by the light-transmitting lens layer 140. In the embodiment, similarly to the first embodiment, the surface 140*s* of the lens layer 140, which fills the lens surfaces 191, on the side opposite to the substrate 19 forms a planar surface which is contiguous to the outside area 10*d* that is positioned on the outer side of the lens surfaces 191 on one surface 19*s* of the substrate 19.

Here, the lens surfaces 191 include concave surfaces which are recessed toward another side surface 19*t* of the substrate 19 from the bottoms 195*a* of the first recess sections 195 which will be described later. In the embodiment, the first recess sections 195 are formed throughout all the areas, in which the plurality of lens surfaces 191 are formed, and spaces between the areas in which the lens surfaces 191 are formed. Therefore, in the spaces 197 between the lens surfaces 191 which are adjacent in a direction in which line XII-XII of FIG. 6 extends, one surface 19*s* of the substrate 19 is not exposed. In addition, the side surfaces of the first recess sections 195 which are perpendicular to one surface 19*s* of the substrate 19 remain only on the lens surfaces 191 which are positioned on the outermost side of the plurality of lens surfaces 191. In addition, in the embodiment, the adjacent lenses 14 are connected to each other over the entire periphery, and thus the first recess sections 195 is formed as an integrated recession section which is connected in the entire area in which the lens surfaces 191 are formed. Therefore, the outer periphery of the first recess sections 195 overlaps the outer periphery of the area (lens forming area 10*e*) in which the plurality of lens surfaces 191 are formed, in a plan view.

In the embodiment, similarly to the first embodiment, the second recess section 196, which is shallower than the bottoms of the lens surfaces 191, is formed on one surface 19*s* of the substrate 19 on the outside of the display area 10*a*, and the mark 199 is formed at the bottom 196*a* of the second recess section 196. The side surface of the second recess section 196 is generally perpendicular to one surface 19*s* of the substrate 19. The depth of the second recess section 196 is equal to those of the first recess sections 195, and the bottom 196*a* of the second recess section 196 is positioned at the same depth of the bottoms 195*a* of the first recess sections 195. In addition, the inside of the second recess section 196 is filled with the lens layer 140, and the lens layer 140 which fills the inside of the second recess section 196 forms a planar surface in which the surface 140*s* on the side opposite to the substrate 19 is contagious to the outside area 10*d* that is positioned on the outer side of the second recess section 196.

As illustrated in FIG. 11, in the method of manufacturing the electro-optical device 100 according to the embodiment, the following steps and the like are performed.

Recess section forming step ST1
Mark forming step ST2
Lens surface forming step ST3
Lens layer forming step ST4
Flattening step ST5
Pixel Forming Step More specifically, in the mask forming step ST1*a* of the recess section forming step ST1 illustrated in FIG. 11, the first etching mask 61 is formed on one surface 190*s* of the mother substrate 190. Here, in the first etching mask 61, all of areas in which the plurality of lens surfaces 191 are formed and areas corresponding to the spaces 197 between the adjacent lens surfaces 191 become the first opening sections 611, as illustrated in FIG. 12. Therefore, in a case in which the etching step ST1*b* illustrated in FIG. 8 is performed, the first recess sections 195 are formed throughout all the areas in which the plurality of lens surfaces 191 are formed and the areas corresponding to the spaces 197 between the adjacent lens surfaces 191.

Subsequently, in the mark forming step ST2 illustrated in FIG. 11, the mark 199 is formed at the bottom 196*a* of the second recess section 196, similarly to the first embodiment. Subsequently, in the lens surface forming step ST3, the second etching mask 62, in which areas overlapping the centers of the lens surfaces 191 in a plan view become opening sections 620, is formed on one surface 190*s* of the mother substrate 190 in the mask forming step ST3*a*, and then isotropy etching is performed from the opening sections 620 to the bottoms 195*a* of the first recess sections 195 in the etching step ST3*b*, thereby forming the lens surfaces 191, which include the concave surfaces in a spherical shape, at the bottoms 195*a* of the first recess sections 195. Subsequently, in the lens layer forming step ST4, the light-transmitting lens layer 140 is formed on one surface 190*s* of the mother substrate 190 such that the first recess sections 195 and the second recess section 196 are filled, and, thereafter, in the flattening step ST5, flattening is performed in such a way that the lens layer 140 is removed from the side opposite to the mother substrate 190 (substrate 19), and the surface 140*s* of the lens layer 140 on the side opposite to the mother substrate 190 forms a planar surface which is contiguous to the outside area 10*d* that is positioned on the outside of the first recess sections 195 and the second recess section 196 on one surface 190*s* of the mother substrate 190. In the embodiment, similarly to the first embodiment, flattening is performed to the midst of the first recess sections 195 and the second recess section 196 in the depth direction. Therefore, only some parts of the first recess sections 195 and the second recess section 196 remain, and the lens surfaces 191 (lenses 14) are provided at the bottoms 195*a* of the remaining first recess sections 195. In addition, the mark 199 remains at the bottom 196*a* of the second recess section 196, and the lens layer 140 remains inside the second recess section 196.

As described above, in the embodiment, similarly to the first embodiment, the surface 140*s* of the lens layer 140 on the side opposite to the substrate 19 is a planar surface which is contiguous to the outside area 10*d* that is positioned on the outer side of the first recess sections 195 on one surface 19*s* of the substrate 19. Therefore, even though high temperature is applied to the lens layer 140, it is difficult for stress to be concentrated on the specific spots of the lens layer 140. Therefore, it is difficult for cracks to be generated in the lens layer 140. In addition, in the flattening step ST5, the lens layer 140, which is formed in the outside area 10*d* that is positioned on the outer side of the first recess sections 195, may be removed, and thus the thickness of the substrate 19, which corresponds to the some parts of the first recess sections 195, may be removed. Therefore, it is difficult for a situation in which some parts of the lens surfaces 191 (concave surfaces) are removed to be generated, thereby acquiring an advantage which is similar to the first embodiment.

In the embodiment, the lens surfaces 191 are formed throughout all the areas in which the plurality of lens surfaces 191 are formed and the areas corresponding to the spaces between the areas in which the lens surfaces 191 are formed, with the result that one surface 19*s* of the substrate 19 is not exposed in the adjacent the spaces 197 between the adjacent lens surfaces 191, and thus the lens surfaces 191 are formed without gaps. Therefore, it is possible to increase the utilization efficiency of light.

Another Embodiment

In the above embodiments, the invention is applied to the electro-optical device 100 in which light is incident from the side of the counter substrate 20. However, the invention may be applied to the electro-optical device 100 in which light is incident from the side of the element substrate 10.

In the above embodiments, the second recess section 196 and the mark 199 are provided in the area 190*a*, which is cut off as the element substrate 10 (lens array substrate 50), of the mother substrate 190. However, the second recess section 196 and the mark 199 may be provided in a removal material area 190*z* which is removed in a case in which the mother substrate 190 is cut off. In this case, the second recess section 196 and the mark 199 do not remain in the element substrate 10 (lens array substrate 50). In the above embodiments, the outer periphery of the first recess sections 195 overlaps the outer periphery of the area (lens forming area 10*e*) in which the plurality of lens surfaces 191 are formed in a plan view. However, in a plan view, the outer periphery of the first recess sections 195 may be provided on the outside of the outer periphery of the area (lens forming area 10*e*) in which the plurality of lens surfaces 191 are formed. That is, the first recess sections 195 may be formed in an area which is wider than the lens forming area 10*e*.

Mounting Example on Electronic Apparatus

Figure 13:
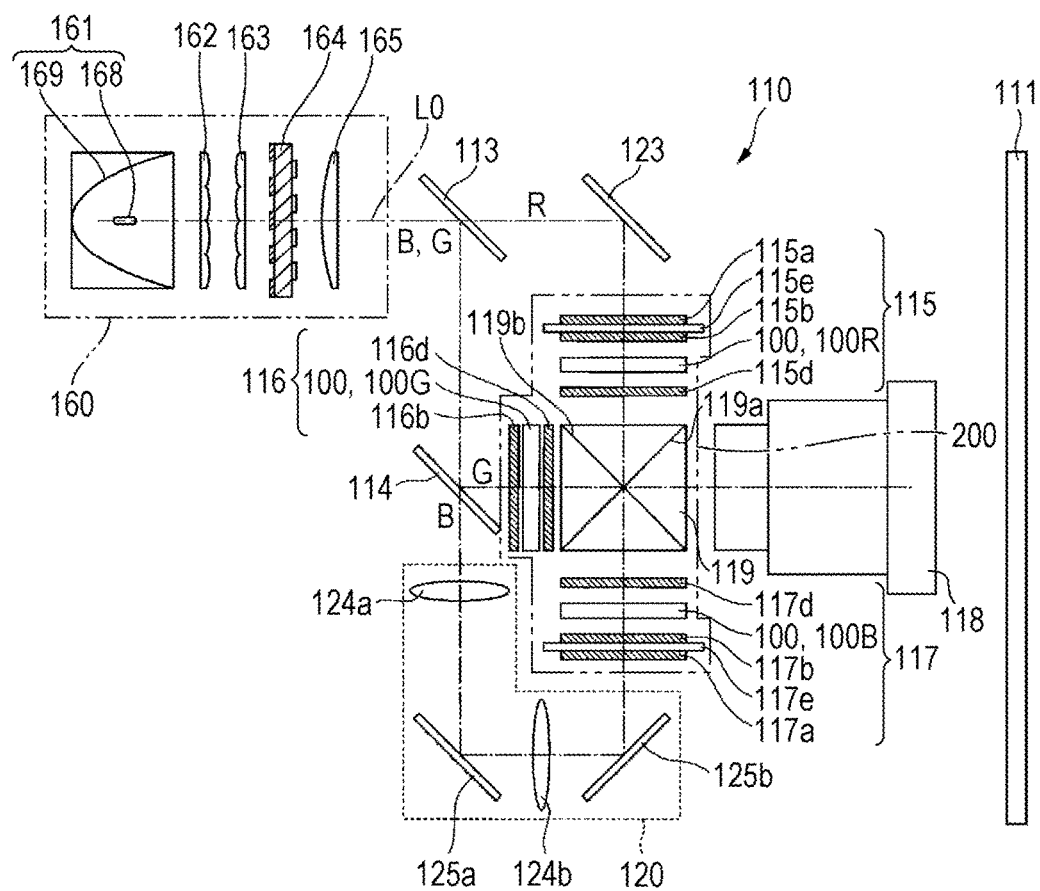
FIG. 13 is a schematic configuration view illustrating a projection-type display apparatus (electronic apparatus) using the electro-optical device to which the invention is applied.

FIG. 13 is a schematic configuration view illustrating a projection-type display apparatus (electronic apparatus) using the electro-optical device 100 to which the invention is applied. Meanwhile, in the description below, a plurality of electro-optical devices 100, to which light having different wavelength areas is supplied, are used. However, the electro-optical device 100 to which the invention is applied is used for all the electro-optical devices 100.

The projection-type display apparatus 110 illustrated in FIG. 13 is a liquid crystal projector using the transmission-type electro-optical device 100, and displays an image by irradiating light to a projection member 111 which includes a screen or the like. The projection-type display apparatus 110 includes, along an optical axis L0 of the apparatus, a lighting device 160, a plurality of electro-optical devices 100 (liquid crystal light valves 115 to 117) to which light emitted from the lighting device 160 is supplied, a cross dichroic prism 119 (photosynthetic optical system) which synthesizes and emits light that is emitted from the plurality of electro-optical devices 100, and a projection optical system 118 which projects light synthesized by the cross dichroic prism 119. In addition, the projection-type display apparatus 110 includes dichroic mirrors 113 and 114, and a relay system 120. In the projection-type display apparatus 110, the electro-optical device 100 and the cross dichroic prism 119 form an optical unit 200.

In the lighting device 160, along the optical axis L0 of the apparatus, a light source section 161, a first integrator lens 162, which includes a lens array such as a fly-eye lens, a second integrator lens 163, which includes a lens array such as a fly-eye lens, a polarized light conversion element 164, and a condenser lens 165 are sequentially arranged. The light source section 161 includes a light source 168 which emits white light including red light R, green light G and blue light B, and a reflector 169. The light source 168 is formed of an extra-high pressure mercury lamp or the like, and the reflector 169 includes a parabolic cross section. The first integrator lens 162 and the second integrator lens 163 equalize the luminance distribution of light emitted from the light source section 161. The polarized light conversion element 164 causes light emitted from the light source section 161 to be polarized light which has a specific vibration direction similar to, for example, s-polarized light.

A dichroic mirror 113 causes red light R, which is included in light emitted from the lighting device 160, to pass therethrough, and reflects green light G and blue light B. A dichroic mirror 114 causes blue light B of green light G and blue light B, which are reflected in the dichroic mirror 113, to pass therethrough, and reflects green light G. As above, the dichroic mirrors 113 and 114 form a color separation optical system which separates light emitted from the lighting device 160 into red light R, green light G, and blue light B.

A liquid crystal light valve 115 is a transmission-type display apparatus that modulates red light R, which passes through the dichroic mirror 113 and is reflected in a reflection mirror 123, according to an image signal. The liquid crystal light valve 115 includes a $\lambda/2$ phase difference plate 115a, a first polarizing plate 115b, an electro-optical device 100 (red electro-optical device 100R), and a second polarizing plate 115d. Here, even in a case in which red light R, which is incident into the liquid crystal light valve 115, passes through the dichroic mirror 113, polarized light is not changed, and thus s-polarized light is not changed.

The $\lambda/2$ phase difference plate 115a is an optical element that converts s-polarized light which is incident into the liquid crystal light valve 115 into p-polarized light. The first polarizing plate 115b is a polarizing plate that cuts off s-polarized light and causes p-polarized light to pass therethrough. The electro-optical device 100 (red electro-optical device 100R) is formed to convert p-polarized light into s-polarized light (in a case of halftone, circularly polarized light or elliptically polarized light) through modulation according to the image signal. The second polarizing plate 115d is a polarizing plate that cuts off p-polarized light and causes s-polarized light to pass therethrough. Accordingly, the liquid crystal light valve 115 modulates red light R according to the image signal, and emits modulated red light R toward the cross dichroic prism 119. The $\lambda/2$ phase difference plate 115a and the first polarizing plate 115b are arranged in a state in which the $\lambda/2$ phase difference plate 115a and the first polarizing plate 115b come into contact with a light-transmitting glass plate 115e which does not convert polarized light, and it is possible to prevent distortion of the $\lambda/2$ phase difference plate 115a and the first polarizing plate 115b due to the generation of heat.

A liquid crystal light valve 116 is a transmission-type display apparatus that modulates green light G, which is reflected in the dichroic mirror 114 after being reflected in the dichroic mirror 113, according to the image signal. The liquid crystal light valve 116 includes a first polarizing plate 116b, an electro-optical device 100 (green electro-optical device 100G), and a second polarizing plate 116d, similar to the liquid crystal light valve 115. Green light G, which is incident into the liquid crystal light valve 116, is s-polarized light which is reflected in and incident into the dichroic mirrors 113 and 114. The first polarizing plate 116b is a polarizing plate that cuts off p-polarized light and causes s-polarized light to pass therethrough. The electro-optical device 100 (green electro-optical device 100G) is formed to convert s-polarized light into p-polarized light (in a case of halftone, circularly polarized light or elliptically polarized light) through modulation according to the image signal. The second polarizing plate 116d is a polarizing plate that cuts off s-polarized light and causes p-polarized light to pass therethrough. Accordingly, the liquid crystal light valve 116 modulates green light G according to the image signal, and emits modulated green light G toward the cross dichroic prism 119.

The liquid crystal light valve 117 is a transmission-type liquid crystal apparatus that modulates blue light B, which is reflected in the dichroic mirror 113 and passes through the relay system 120 after passing through the dichroic mirror 114, according to the image signal. The liquid crystal light valve 117 includes a $\lambda/2$ phase difference plate 117a, a first polarizing plate 117b, an electro-optical device 100 (blue electro-optical device 100B), and a second polarizing plate 117d, similar to the liquid crystal light valves 115 and 116. Blue light B, which is incident into the liquid crystal light valve 117, is reflected in the two reflection mirrors 125a and 125b of the relay system 120 after being reflected in the dichroic mirror 113 and passing through the dichroic mirror 114, and thus blue light B becomes s-polarized light.

The $\lambda/2$ phase difference plate 117a is an optical element that converts s-polarized light, which is incident into the liquid crystal light valve 117, into p-polarized light. The first polarizing plate 117b is a polarizing plate that cuts off s-polarized light and causes p-polarized light to pass therethrough. The electro-optical device 100 (blue electro-optical device 100B) is formed to convert p-polarized light into s-polarized light (in a case of halftone, circularly polarized light or elliptically polarized light) through modulation according to the image signal. The second polarizing plate 117d is a polarizing plate that cuts off p-polarized light and causes s-polarized light to pass therethrough. Accordingly, the liquid crystal light valve 117 modulates blue light B according to the image signal, and emits modulated blue light B toward the cross dichroic prism 119. Meanwhile, the $\lambda/2$ phase difference plate 117a and the first polarizing plate 117b are arranged in a state in which the $\lambda/2$ phase difference plate 117a and the first polarizing plate 117b come into contact with a glass plate 117e.

The relay system 120 includes relay lenses 124a and 124b and reflection mirrors 125a and 125b. The relay lenses 124a and 124b are provided to prevent optical loss due to long optical path of blue light B. The relay lens 124a is arranged between the dichroic mirror 114 and the reflection mirror 125a. The relay lens 124b is arranged between the reflection mirrors 125a and 125b. The reflection mirror 125a reflects blue light B, which passes through the dichroic mirror 114 and is emitted from the relay lens 124a, toward the relay lens 124b. The reflection mirror 125b reflects blue light B, which is emitted from the relay lens 124b, toward the liquid crystal light valve 117.

The cross dichroic prism 119 is a color synthesis optical system in which two dichroic films 119a and 119b are perpendicularly arranged in an X-shape. The dichroic film 119a is a film which reflects blue light B and causes green light G to pass therethrough, and the dichroic film 119b is a film which reflects red light R and causes green light G to pass therethrough. Accordingly, the cross dichroic prism 119 synthesizes red light R, green light G, and blue light B which are modulated in respective liquid crystal light valves 115 to 117, and emits synthesized light toward the projection optical system 118.

Meanwhile, light which is incident into the cross dichroic prism 119 from the liquid crystal light valves 115 and 117 is s-polarized light, and light which is incident into the cross dichroic prism 119 from the liquid crystal light valve 116 is p-polarized light. As above, in a case in which light which is incident into the cross dichroic prism 119 is converted into different types of polarized light, it is possible to synthesize light which is incident from each of the liquid crystal light valves 115 to 117 in the cross dichroic prism 119. Here, generally, the dichroic films 119*a* and 119*b* are excellent in reflectance properties of s-polarized light. Therefore, it is assumed that red light R and blue light B which are reflected in the dichroic films 119*a* and 119*b* are s-polarized light and green light G which passes through the dichroic films 119*a* and 119*b* is p-polarized light. The projection optical system 118 includes projection lenses (not shown in the drawing), and projects light which is synthesized in the cross dichroic prism 119 on to a projection member 111 such as the screen.

Other Projection-Type Display Apparatuses

In the projection-type display apparatus, an LED light source, which emits light of the respective colors, or the like may be used as the light source section, and respective colors which are emitted from the LED light source may be supplied to separated liquid crystal apparatuses.

The electro-optical device 100 to which the invention is applied may be used for a projection-type Head-Up Display (HUD) or a direct viewing type Head Mounted Display (HMD), a mobile phone, a Personal Digital Assistants (PDA), a digital camera, a liquid crystal television, a car navigation apparatus, a video phone and the like, in addition to the electronic apparatus.

This application claims priority from Japanese Patent Application No. 2016-015309 filed in the Japanese Patent Office on Jan. 29, 2016, the entire disclosure of which is hereby incorporated by reference in its entirety.

What is claimed is:

1. A lens array substrate comprising:
   a light-transmitting substrate on one surface of which a plurality of lens surfaces, which include concave surfaces, are formed; and
   a light-transmitting lens layer that covers the plurality of lens surfaces,
   wherein
      first recess sections are provided on the one surface of the substrate,
      the lens surfaces are provided to be recessed from bottoms of the first recess sections toward another side surface of the substrate,
      a surface of the lens layer on a side opposite to the substrate is contiguous with a portion of the one surface of the substrate that is positioned in an outside area that is outside of the first recess sections on the one surface of the substrate such that the surface of the lens layer and the portion of the one surface of the substrate form a planar surface, and
      a second recess section, which includes a mark at a bottom, is provided on the one surface of the substrate.

2. The lens array substrate according to claim 1, wherein the first recess sections are provided in respective areas in which the plurality of lens surfaces are formed.

3. The lens array substrate according to claim 1, wherein the first recess sections are provided throughout all the areas in which the plurality of lens surfaces are formed and areas corresponding to spaces between the areas in which the plurality of lens surfaces are formed.

4. An electro-optical device, which includes the lens array substrate according to claim 1, comprising:
   pixel electrodes that overlap the lens surfaces in a plan view viewed from a direction which is perpendicular to the substrate.

5. An electro-optical device, which includes the lens array substrate according to claim 1, comprising:
   pixel electrodes that overlap the lens surfaces in a plan view viewed from a direction which is perpendicular to the substrate.

6. An electro-optical device, which includes the lens array substrate according to claim 2, comprising:
   pixel electrodes that overlap the lens surfaces in a plan view viewed from a direction which is perpendicular to the substrate.

7. An electro-optical device, which includes the lens array substrate according to claim 3, comprising:
   pixel electrodes that overlap the lens surfaces in a plan view viewed from a direction which is perpendicular to the substrate.

8. An electro-optical device, which includes the lens array substrate according to claim 4, comprising:
   an element substrate that is provided with the pixel electrodes and pixel transistors which are electrically connected to the pixel electrodes;
   a counter substrate that is provided with common electrodes which face the pixel electrodes; and
   an electro-optical layer that is provided between the element substrate and the counter substrate,
   wherein the lens array substrate is used for at least one of the element substrate and the counter substrate.

9. An electronic apparatus comprising the electro-optical device according to claim 4.

10. An electronic apparatus comprising the electro-optical device according to claim 5.

11. An electronic apparatus comprising the electro-optical device according to claim 6.

12. An electronic apparatus comprising the electro-optical device according to claim 7.

13. An electronic apparatus comprising the electro-optical device according to claim 8.

14. A lens array substrate manufacturing method comprising:
   forming first recess sections on one surface of a light-transmitting substrate;
   forming a second recess section on the one surface of the light-transmitting substrate;
   forming a mark at a bottom of the second recess section;
   forming a plurality of lens surfaces, which includes concave surfaces, at bottoms of the first recess section;
   forming a light-transmitting lens layer on the one surface of the substrate to fill insides of the first recess sections; and
   flattening the lens layer by removing the lens layer up to the first recess sections in a depth direction from a side opposite to the substrate, while monitoring a thickness of the lens layer to be removed using the mark as an index, and causing a surface of the lens layer on a side opposite to the substrate to be contiguous with a portion of the one surface of the substrate that is positioned in an outside area that is outside of the first recess sections on the one surface of the substrate such that the surface of the lens layer and the portion of the one surface of the substrate form a planar surface.

15. The lens array substrate manufacturing method according to claim 14,
   wherein the forming of the first recess sections includes forming the first recess sections in respective areas in which the plurality of lens surfaces are formed.

16. The lens array substrate manufacturing method according to claim 14, wherein the forming of the first recess sections includes forming the first recess sections throughout all areas in which the plurality of lens surfaces are formed and areas corresponding to spaces between the areas in which the plurality of lens surfaces are formed.

17. An electro-optical device manufacturing method using the lens array substrate manufacturing method according to claim 14, comprising:

forming, after the lens layer is formed, a plurality of pixel electrodes on the lens layer on a side opposite to the substrate, the plurality of pixel electrodes overlapping the plurality of respective lens surfaces in a plan view viewed from a direction which is perpendicular to the substrate, and a plurality of pixel switching elements that are electrically connected to the plurality of respective pixel electrodes.

\* \* \* \* \*